United States Patent
Uchida

(10) Patent No.: US 8,424,063 B2
(45) Date of Patent: Apr. 16, 2013

(54) WORKFLOW MANAGEMENT APPARATUS AND WORKFLOW MANAGEMENT METHOD

(75) Inventor: Momoe Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 459 days.

(21) Appl. No.: 12/419,759

(22) Filed: Apr. 7, 2009

(65) Prior Publication Data

US 2009/0260076 A1    Oct. 15, 2009

(30) Foreign Application Priority Data

Apr. 10, 2008 (JP) ................................ 2008-102687

(51) Int. Cl.
*G06F 21/00* (2006.01)

(52) U.S. Cl.
USPC .............. 726/4; 726/2; 726/3; 726/17; 718/1; 713/1; 713/2; 709/216; 709/217; 709/218; 709/219; 709/220; 709/221; 709/222; 711/6

(58) Field of Classification Search ..................... 726/17, 726/4; 718/1; 709/22; 711/6
See application file for complete search history.

(56) References Cited

U.S. PATENT DOCUMENTS

| | | | | |
|---|---|---|---|---|
| 6,151,583 | A * | 11/2000 | Ohmura et al. ............... | 705/7.26 |
| 6,574,662 | B2 * | 6/2003 | Sugiyama et al. ............ | 709/223 |
| 6,799,314 | B2 * | 9/2004 | Beniyama et al. ............ | 717/100 |
| 7,254,682 | B1 * | 8/2007 | Arbon ........................... | 711/161 |
| 2001/0049751 | A1 * | 12/2001 | Nakamura et al. ............ | 709/313 |
| 2004/0059635 | A1 * | 3/2004 | Chang et al. .................... | 705/22 |
| 2004/0076941 | A1 * | 4/2004 | Cunningham et al. ........ | 434/350 |
| 2005/0015711 | A1 * | 1/2005 | Yamamoto et al. ............ | 715/500 |
| 2005/0091600 | A1 * | 4/2005 | Yamamoto et al. ............ | 715/752 |
| 2005/0202390 | A1 * | 9/2005 | Allen et al. .................... | 434/353 |
| 2005/0216395 | A1 * | 9/2005 | Behmoiras et al. ............. | 705/38 |
| 2005/0223025 | A1 * | 10/2005 | Bennett, Jr. ................... | 707/102 |
| 2006/0274970 | A1 * | 12/2006 | Seki et al. ..................... | 382/276 |
| 2006/0274971 | A1 * | 12/2006 | Kumazawa et al. ........... | 382/276 |
| 2007/0028207 | A1 * | 2/2007 | Nakata et al. ................. | 717/100 |
| 2007/0070412 | A1 * | 3/2007 | Kawara ........................ | 358/1.15 |
| 2007/0179814 | A1 * | 8/2007 | Hernandez et al. ............... | 705/3 |
| 2007/0219839 | A1 * | 9/2007 | Tanabe ............................. | 705/8 |
| 2007/0247466 | A1 * | 10/2007 | Kumazawa et al. ........... | 345/506 |
| 2008/0114791 | A1 * | 5/2008 | Takatsu et al. ................ | 707/100 |
| 2008/0162567 | A1 * | 7/2008 | Yamauchi et al. ......... | 707/104.1 |
| 2008/0183536 | A1 * | 7/2008 | Hirabayashi ...................... | 705/8 |
| 2009/0027724 | A1 * | 1/2009 | Nagase et al. ................ | 358/1.15 |

FOREIGN PATENT DOCUMENTS

JP            2005-50318 A         2/2005

OTHER PUBLICATIONS

Espacenet Search Results, Espacenet Result List, Jul. 25, 2011.*
Sea Ling et al, Verification of Itineraries for mobile agent enabled interorganizational workflow, 2001.*
Espacenet search, Espacenet Result List, Jan. 2012.*

* cited by examiner

*Primary Examiner* — Andy Rao
*Assistant Examiner* — Shan Elahi
(74) *Attorney, Agent, or Firm* — Canon USA Inc. IP Division

(57) ABSTRACT

A server apparatus generates a folder for content to be transmitted from an image processing apparatus, and sets a path of the folder to the image processing apparatus as a destination of sending of the content. The user is allowed to select one destination of sending set in a display panel of the image processing apparatus, and the image processing apparatus sends the content to the selected destination of sending.

7 Claims, 19 Drawing Sheets

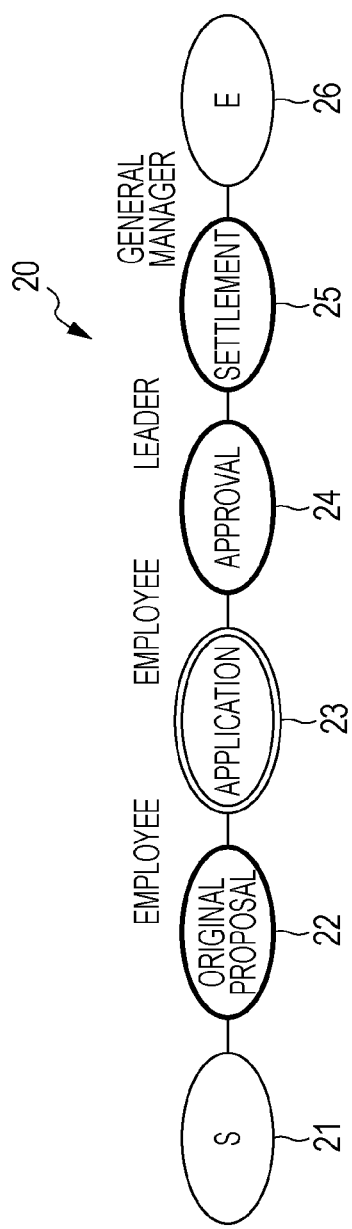

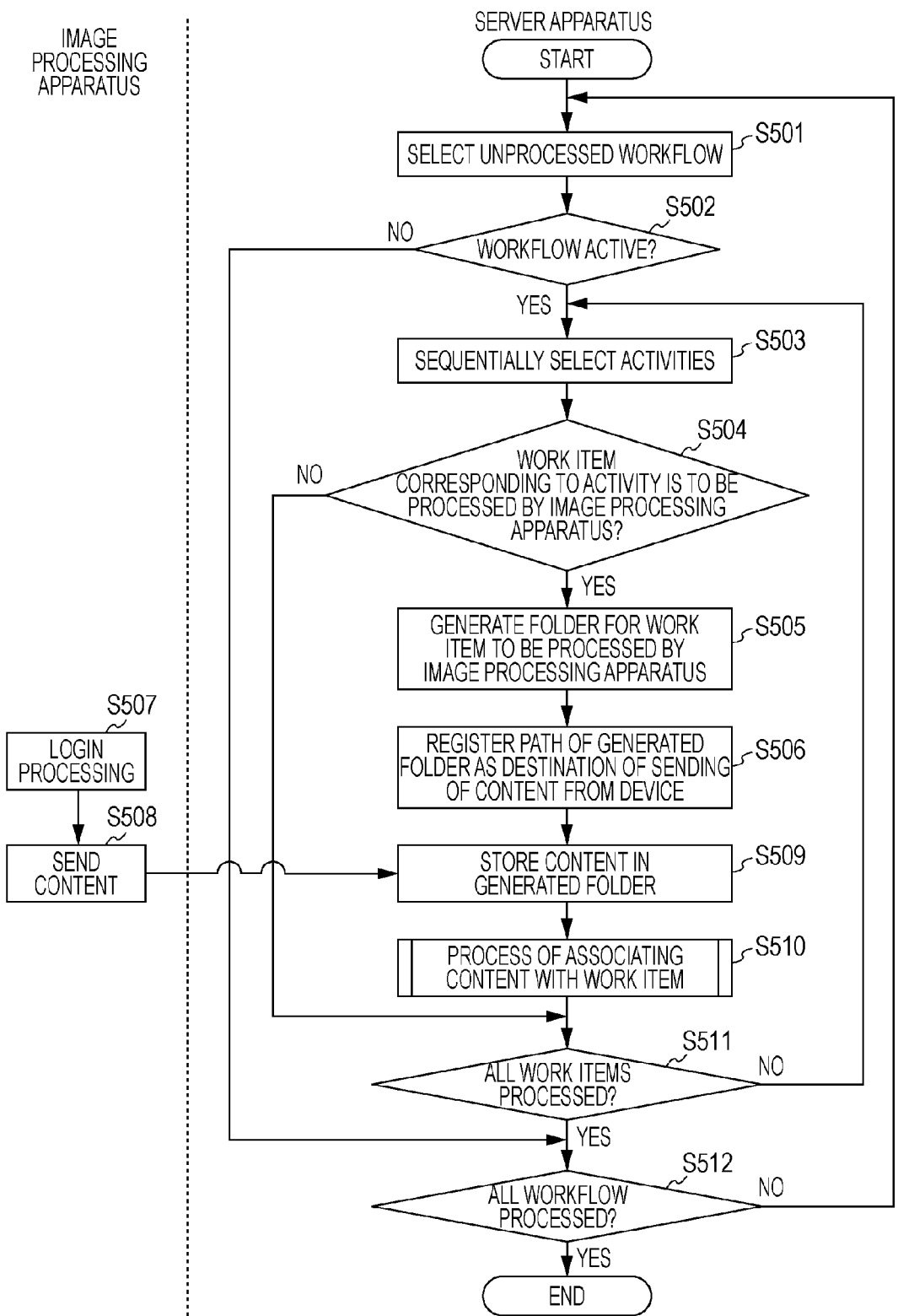

| 71 | DESTINATION NAME | TRANSPORTATION EXPENSE APPLICATION (TARO) |
|---|---|---|
| 72 | PROTOCOL | WINDOWS (SMB) |
| 73 | HOST NAME | \\172.24.136.110 |
| 74 | PATH OF FOLDER | \\users\Taro |

FIG. 8B

DESTINATION TABLE

DESTINATION TABLE ☐    ☐ TYPE OF DESTINATION    DESTINATION COUNTS: 0

DESTINATION TABLE 2 ▽    ○ ALL ▽

| ✓ | TYPE | NAME | DESTINATION |
|---|------|------|-------------|
| ☐ | 📠 | TRANSPORTATION EXPENSES BILL (TARO) | \\172.24.136.110 |

◁ 1/1 ▷

REGISTER

DETAILED INFORMATION △

| A | B | C | D | E | F | G | H... | A-Z | 0-9 | ALL |

CANCEL    OK

| DATE AND TIME | USER | OPERATION |
|---|---|---|
| 10/04/2007 20:00 | USER C | COPY |
| 11/04/2007 15:00 | USER A | SEND TO TMP1 |

| DATE AND TIME | USER | OPERATION |
|---|---|---|
| 11/04/2007 21:00 | USER C | SEND TO TMP2 |
| 12/04/2007 21:00 | USER A | SEND TO TMP2 |
| 13/04/2007 17:00 | USER B | COPY |

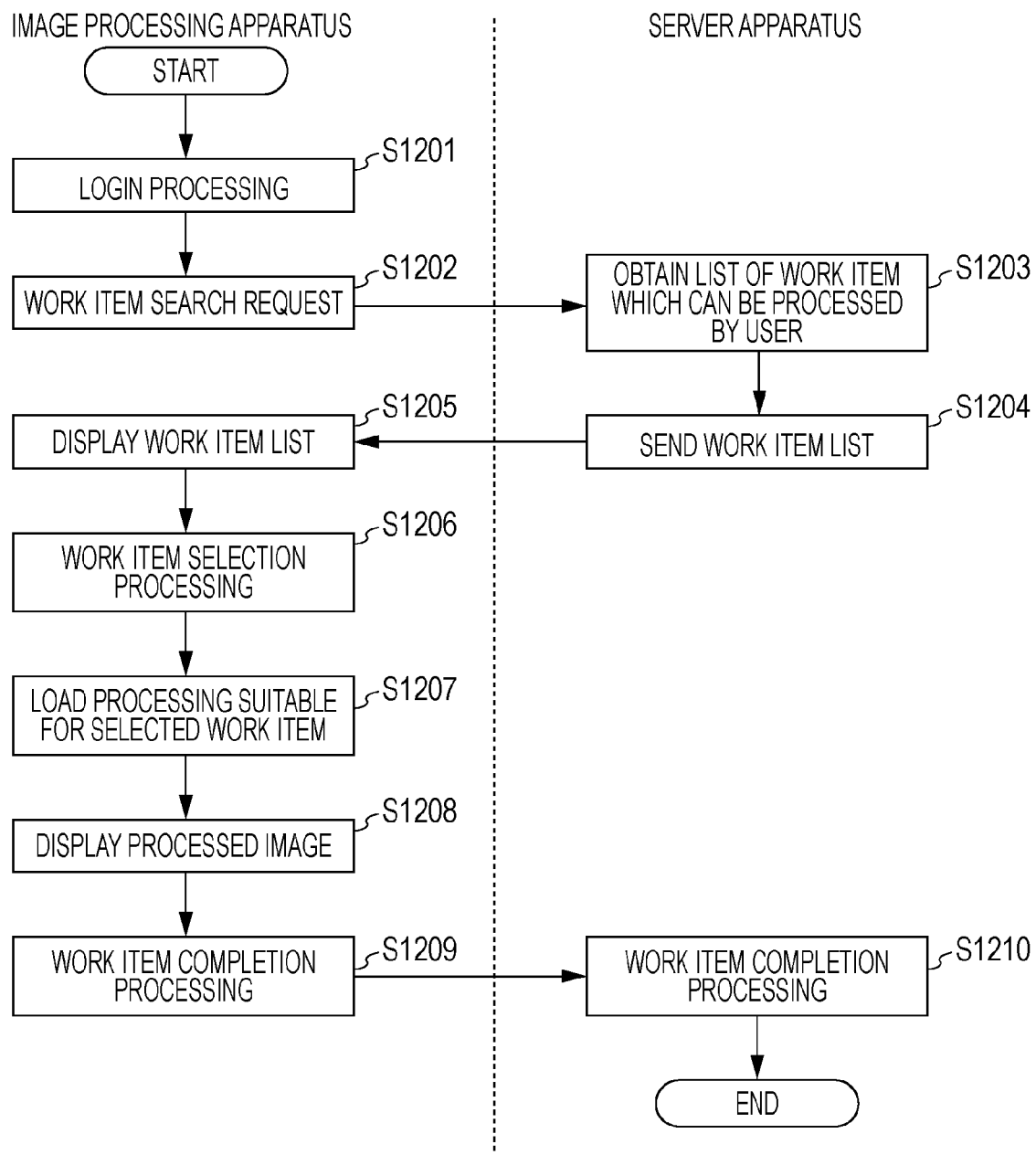

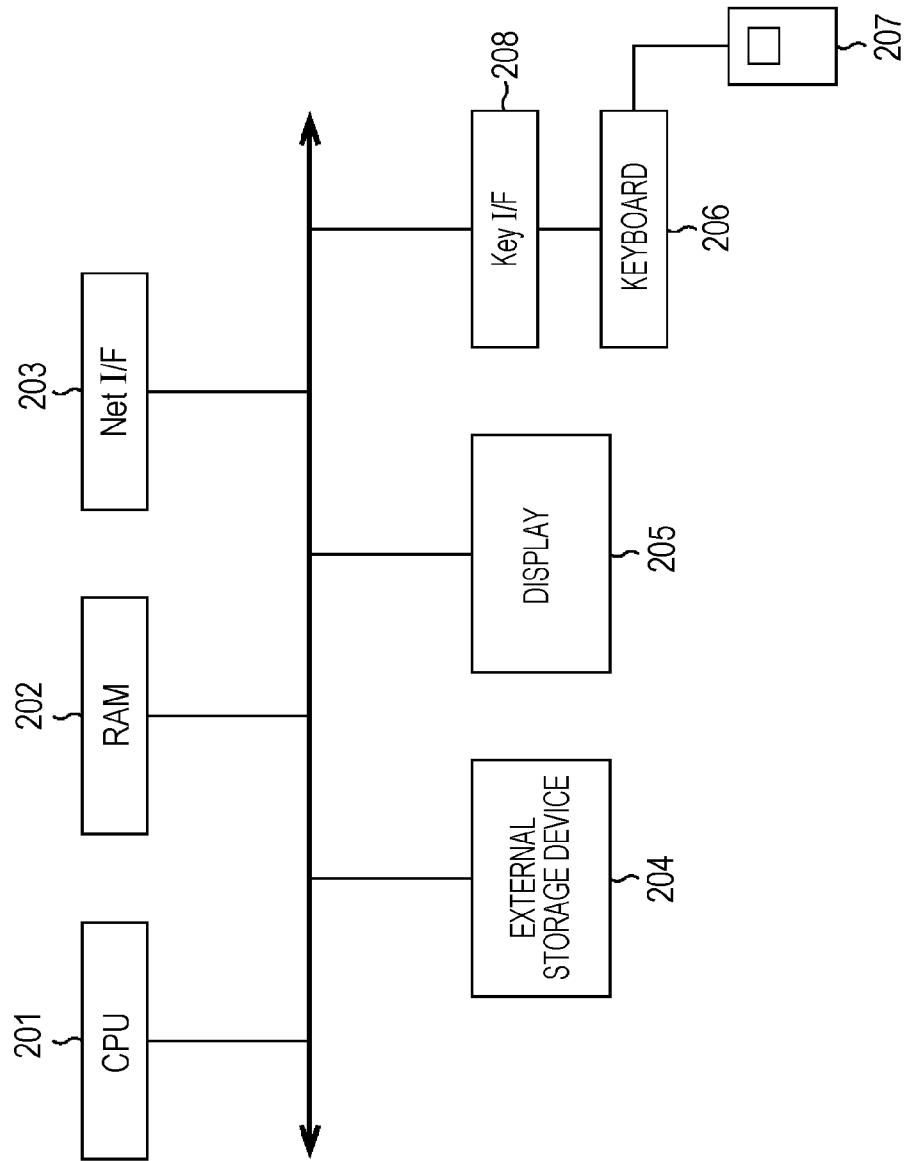

WORKFLOW MANAGEMENT APPARATUS AND WORKFLOW MANAGEMENT METHOD

BACKGROUND OF THE INVENTION

1. Field of the Invention

The present invention relates to workflow management apparatuses, workflow management methods, and computer programs, and particularly relates to a workflow management apparatus, a workflow management method, and a computer program, which are used for managing and performing a workflow.

2. Description of the Related Art

A system in which a workflow including a series of works starting from an original proposal, an application, an approval, to a settlement is defined to automate a flow of the works, and a voucher (paper document) is scanned so that the scanned voucher is circulated as a document attached to work data in the workflow that has been proposed. This system is employed in voucher scanning and voucher solution.

In an example of a workflow of an application of a transportation expense, a receipt is scanned by a device so that electronic data of the receipt is obtained, and the electronic data of the receipt is attached to a prepared application for application processing.

In order to execute such a workflow, in a technique of a workflow system which is disclosed in Japanese Patent Laid-Open No. 2005-50318 and which realizes a document flow, a plurality of UIs (User Interfaces) are provided for executing steps included in the workflow. In the technique disclosed in Japanese Patent Laid-Open No. 2005-50318, the UIs (screens) suitable for environments of processes executed by a user, such as a PC (Personal Computer), a mobile terminal, and an MFP (Multi Function Peripheral), are displayed. When the user operates one of the UIs, the user can operate the document flow.

However, in the technique of Japanese Patent Laid-Open No. 2005-50318, terminals should have programs used to display the UIs suitable for the environments of the processes executed by the user. For example, the MFP is equipped with a Java platform used to operate applications and programs, and the programs used to execute the workflow should be operated in this platform.

SUMMARY OF THE INVENTION

The present invention provides a technique of executing processes of a workflow without specific programs used to execute the processes of the workflow in an image processing apparatus such as an MFP.

A server apparatus generates a folder for content to be transmitted from the image processing apparatus, and sets a path of the folder to the image processing apparatus as a sending destination of the content. The user is allowed to select one of destinations of sending thus set in a display panel of the image processing apparatus, and the image processing apparatus sends the content to the selected destination of sending.

According to an exemplary embodiment of the present invention, there is provided a workflow management apparatus which manages a workflow for executing processing in accordance with work items representing operations. The workflow management apparatus includes a generator configured to generate a folder for each of the work items to be processed by an image processing apparatus, a registration unit configured to register information on a location of the folder generated by the generator as a sending destination of the content generated by the image processing apparatus in accordance with the work item, a storage unit configured to store the content supplied from the image processing apparatus in the folder serving as the sending destination of the content, and an association unit configured to associate the content stored in the folder by the storage unit with the work item corresponding to the folder.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 2 is a diagram schematically illustrating an example of a workflow according to the first exemplary embodiment of the present invention.

FIG. 3 is a diagram illustrating examples of the relationships between roles and users according to the first exemplary embodiment of the present invention.

FIG. 5 is a flowchart illustrating an example of an operation of the workflow processing system according to the first exemplary embodiment of the present invention.

FIGS. 8A and 8B are diagrams illustrating examples of images displayed in a display panel included in the image processing apparatus when the content is sent according to the first exemplary embodiment of the present invention.

FIGS. 11A and 11B are diagrams illustrating examples of a job log according to the first exemplary embodiment of the present invention.

FIG. 13 is a flowchart illustrating an example of processing of the workflow processing system when a work item is processed using a specific application included in an image processing apparatus, according to the second exemplary embodiment of the present invention.

FIG. 15 is a block diagram illustrating an example of a configuration of the server apparatus or the personal computer according to the first and second exemplary embodiments of the present invention.

DESCRIPTION OF THE EXEMPLARY EMBODIMENTS

Various exemplary embodiments of the present invention will now be described in detail with reference to the accompanying drawings.

A first exemplary embodiment of the present invention will now be described with reference to the accompanying drawings.

Descriptions of Terms

Terms used herein will be defined.
1. Activity: a unit of processing in a workflow.
2. Work Item (WI): a detailed operation in an activity executed by a user.
3. Send: a function of sending e-mails or a function of sending a file using an SMB (Server Message Block) protocol or FTP (File Transfer Protocol), which is a protocol for file sharing in an image processing apparatus.
4. Job Log: a log of operations performed in the image processing apparatus, the log being stored in the image processing apparatus.

System Configuration

Figure 1:
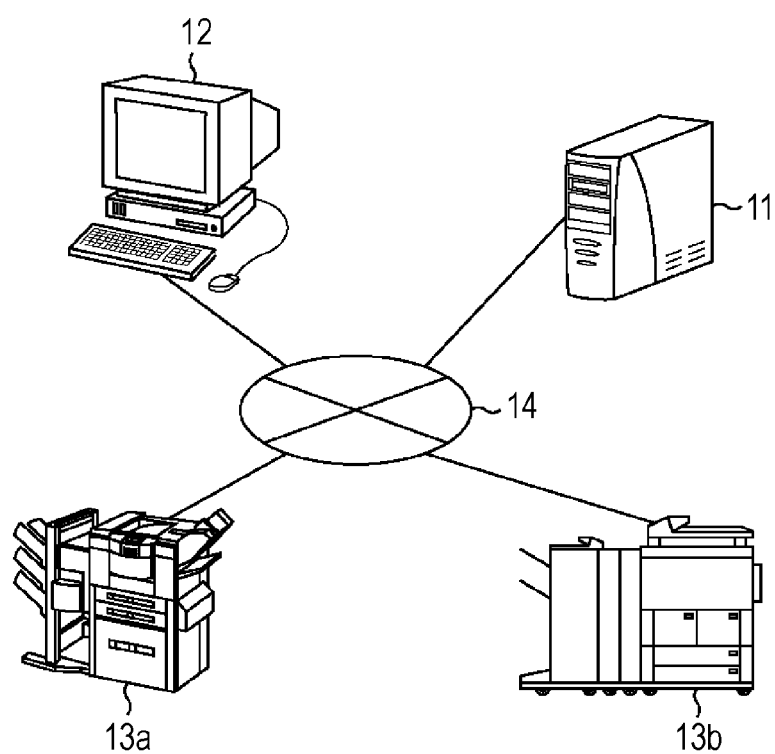
FIG. 1 is a diagram illustrating an example of a configuration of an entire workflow processing system according to a first exemplary embodiment of the present invention.

FIG. 1 is a diagram illustrating an example of a configuration of an entire workflow processing system according to a first exemplary embodiment of the present invention.

In FIG. 1, the workflow processing system includes a server apparatus 11 which manages and executes a workflow, a PC 12 which is a client terminal apparatus, and image processing apparatuses 13a and 13b, such as MFPs. The server apparatus 11, the PC 12, and the image processing apparatuses 13a and 13b are connected to a network 14, such as a LAN (Local Area Network), and perform data communication with one another using a protocol such as a TCP/IP (Transmission Control Protocol/Internet Protocol) or an SNMP (Simple Network Management Protocol).

The number of apparatuses is not limited to the number shown in FIG. 1. However, in this exemplary embodiment, description will be made where the single server apparatus 11, the single PC 12, and the two image processing apparatuses 13a and 13b are connected to the network 14. The server apparatus 11 manages the image processing apparatuses 13a and 13b capable of executing a workflow.

In this exemplary embodiment, specific application programs (hereinafter simply referred to as "applications") used to execute processing of the workflow cannot be loaded in the PC 12 and the image processing apparatuses 13a and 13b. For example, the image processing apparatuses 13a and 13b do not have Java (registered trademark) platforms, and therefore, the specific applications used to execute the processing of the workflow cannot be loaded in the image processing apparatuses 13a and 13b.

Workflow

FIG. 2 is a diagram schematically illustrating an example of a workflow according to the first exemplary embodiment.

In FIG. 2, a workflow 20 includes a starting activity 21, an ending activity 26, an original proposal activity 22, an application activity 23, an approval activity 24, and a settlement activity 25. These activities 22 to 25 are categorized into activities to be processed by the image processing apparatuses 13a and 13b or activities to be processed by the PC 12. In the example shown in FIG. 2, the original proposal activity 22, the approval activity 24, and the settlement activity 25 are to be processed by the PC 12. The application activity 23 is to be processed by the image processing apparatus 13a. In this exemplary embodiment, a work item of the application activity 23 is executed by sending arbitrary content to the server apparatus 11.

Roles for specifying persons who execute the activities 22 to 25 (for example, persons who have authority to execute) are assigned to the activities 22 to 25. In the example of FIG. 2, an employee role is assigned to the original proposal activity 22 and the application activity 23, a leader role is assigned to the approval activity 24, and a general-manager role is assigned to the settlement activity 25.

In this exemplary embodiment, every time one of the activities 22 to 25 is terminated, a work item to be executed by a user specified by a role set to one of the activities 22 to 25 to be processed next is generated.

Role and User

FIG. 3 is a diagram illustrating examples of the relationships between roles and users.

As shown in FIG. 3, the relationships between roles and users are described as follows.

Employee role: user A and user C

Leader role: user B

General-manager role: user D

The server apparatus 11 generates an association table 30 as shown in FIG. 3 in accordance with a user's operation, and stores the association table 30 in an internal storage medium, such as an HDD.

Workflow

Figure 4:
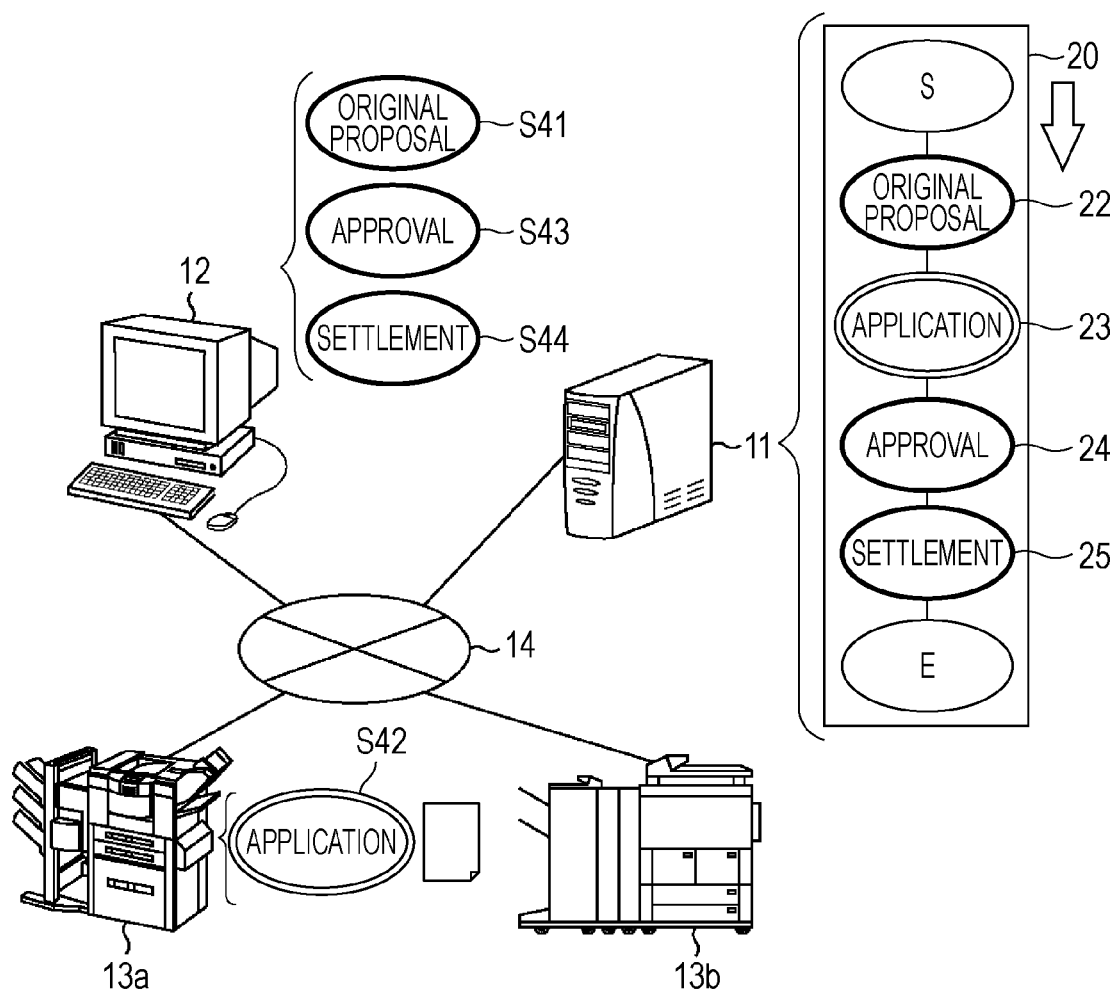
FIG. 4 is a diagram schematically illustrating an example of an outline of processing of the workflow processing system according to the first exemplary embodiment of the present invention.

FIG. 4 is a diagram schematically illustrating an example of an outline of processing of the workflow processing system.

In FIG. 4, the server apparatus 11 manages the workflow 20, and processes the activities 22 to 25 of the workflow 20 in this order. When the workflow 20 is started, a work item of original proposal is generated for the users A and C who have the employee role set to the original proposal activity 22 which is a first activity. The PC 12 performs processing in accordance with the work item of original proposal in response to operations performed by the users A and C in step S41. Then, a work item of application is generated for the users A and C who have the employee role set to the next activity, the application activity 23. The image processing apparatus 13a performs processing in accordance with the work item of application in response to operations performed by the users A and C in step S42. The work item of application is executed when the image processing apparatus 13a sends content to the server apparatus 11. In this exemplary embodiment, the image processing apparatus 13a selected from among the two image processing apparatuses shown in FIG. 1 performs the processing in accordance with the work item of application is described as an example. However, the other image processing apparatus, the image processing apparatus 13b may perform the processing in accordance with the work item of application.

A work item of approval is generated for the user B who has the leader role set to the next activity, the approval activity 24. The PC 12 performs processing in accordance with the work item of approval in response to an operation performed by the user B in step S43. After the work item of approval is processed, a work item of settlement is generated for the user D who has the general-manager role set to the next activity, the settlement activity 25. The PC 12 performs processing in accordance with the work item of settlement in response to an operation performed by the user D in step S44.

The workflow 20 is thus completed.

FIG. 5 is a flowchart illustrating an example of an operation of the workflow processing system.

Figure 6A:
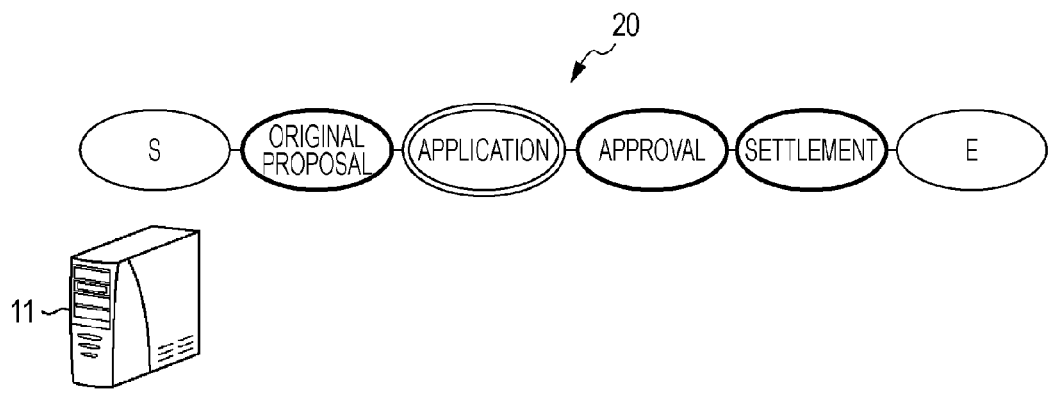
FIG. 6A is a diagram schematically illustrating an example of a state of a workflow before the operation is performed according to the first exemplary embodiment of the present invention.

The server apparatus 11 selects a workflow 20 which has not yet been processed from among workflows 20 managed in step S501. FIG. 6A is a diagram schematically illustrating an example of a state of the workflow 20 before the operation is performed.

In step S502, the server apparatus 11 determines whether the workflow 20 selected in step S501 is in an active state. When the determination is negative, the process proceeds to step S512, which will be described hereinafter. When the determination is positive, the process proceeds to step S503.

Figure 6B:
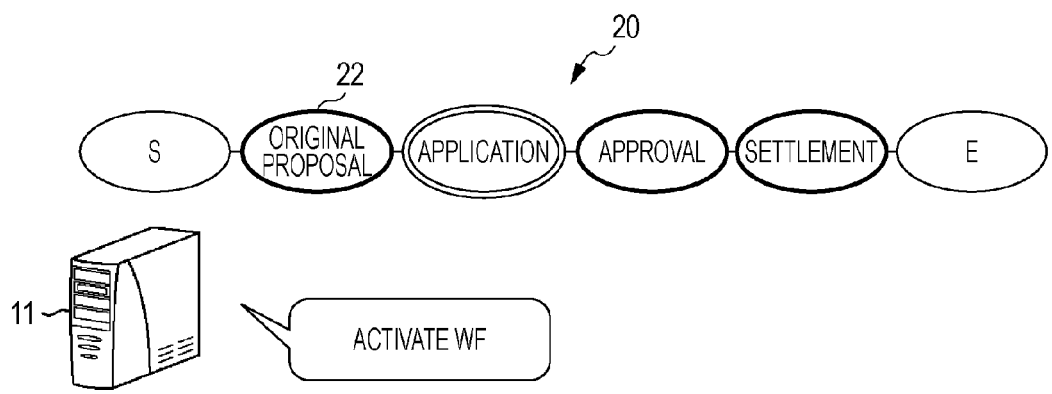
FIG. 6B is a diagram schematically illustrating an example of a state of the workflow when the operation is started according to the first exemplary embodiment of the present invention.

FIG. 6B is a diagram schematically illustrating an example of a state of the workflow 20 when the operation is started. In this exemplary embodiment, when the workflow 20 is started, the workflow 20 is activated and a work item for the first activity, the original proposal activity 22 is generated.

In step S503, the server apparatus 11 successively selects the activities 22 to 25 of the workflow 20 selected in step S501 in this order.

In this exemplary embodiment, the activities (work items) 22 to 25 are categorized into the activities processed by the PC 12 and activities processed by the image processing apparatus 13a. In step S504, the server apparatus 11 determines whether a work item corresponding to "the activity selected in step S503" in the workflow 20 is to be processed by the image processing apparatus 13a. The determination is made in accordance with information assigned to the work items corresponding to the activities 22 to 25 of the workflow 20.

When the determination is negative in step S504, the process proceeds to step S511, which will be described hereinafter. When the determination is positive, the process proceeds to step S505.

Figure 6C:
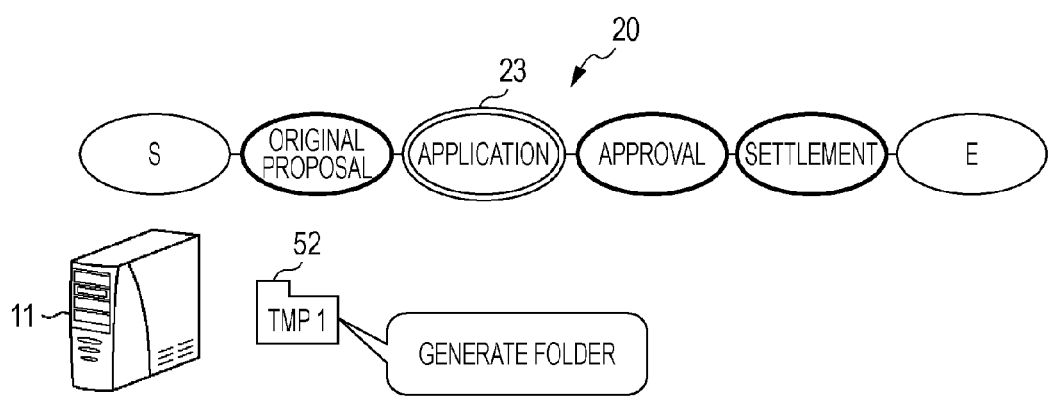
FIG. 6C is a diagram schematically illustrating an example of a state in which a folder for a work item is generated according to the first exemplary embodiment of the present invention.

In step S505, the server apparatus 11 generates a folder 52 for the work item to be processed by the image processing apparatus 13a therein. FIG. 6C is a diagram schematically illustrating an example of a state in which the folder 52 for the work item is generated. The generated folder 52 is stored in an HDD, for example, in the server apparatus 11.

As described above, an example of a generator is realized by performing the operation of step S505, in this exemplary embodiment.

Figure 6D:
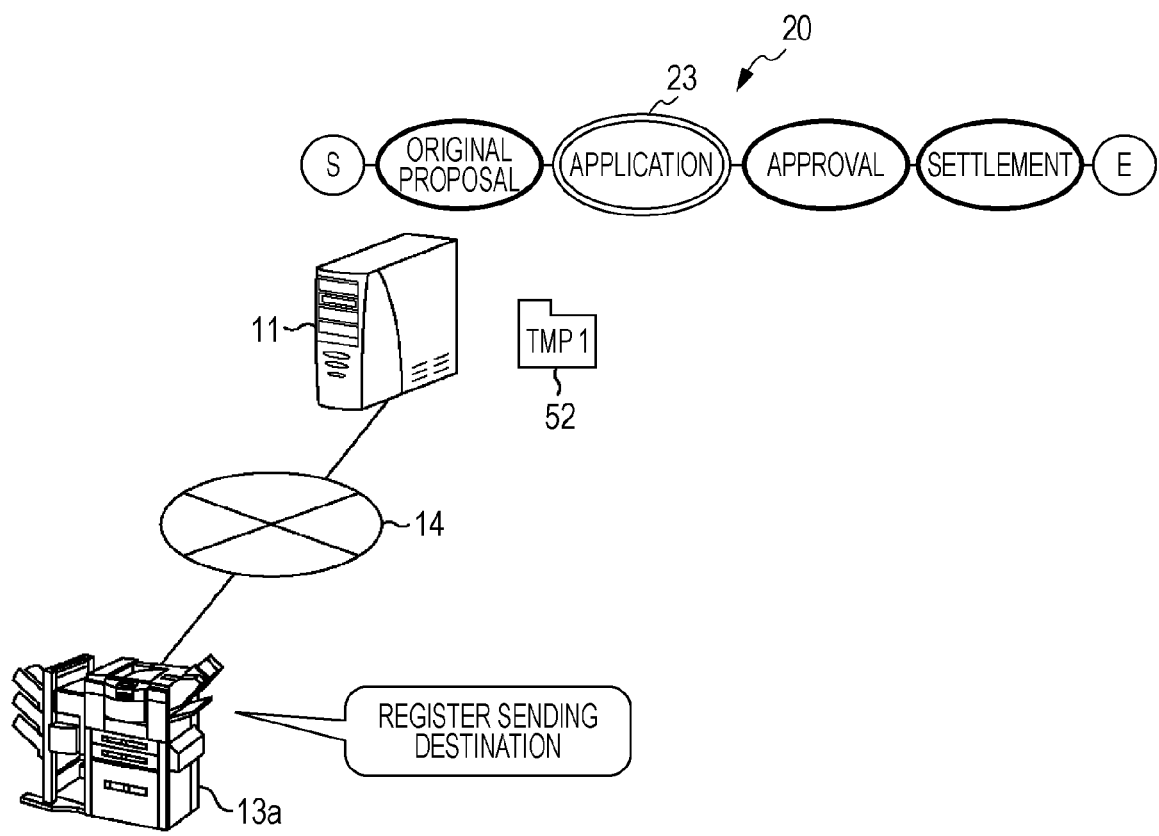
FIG. 6D is a diagram schematically illustrating an example of a state in which a path of the folder is registered as a Send destination (destination of sending) in an image processing apparatus according to the first exemplary embodiment of the present invention.

In step S506, the server apparatus 11 registers a path (information representing a location) of the folder 52 generated in step S505 as a Send destination (destination of sending) in the image processing apparatus 13a managed by the server apparatus 11. FIG. 6D is a diagram schematically illustrating an example of a state in which the path of the folder 52 is registered as the Send destination in the image processing apparatus 13a.

An example of a registration unit is realized by performing the operation of step S506, in this exemplary embodiment.

Figure 6E:
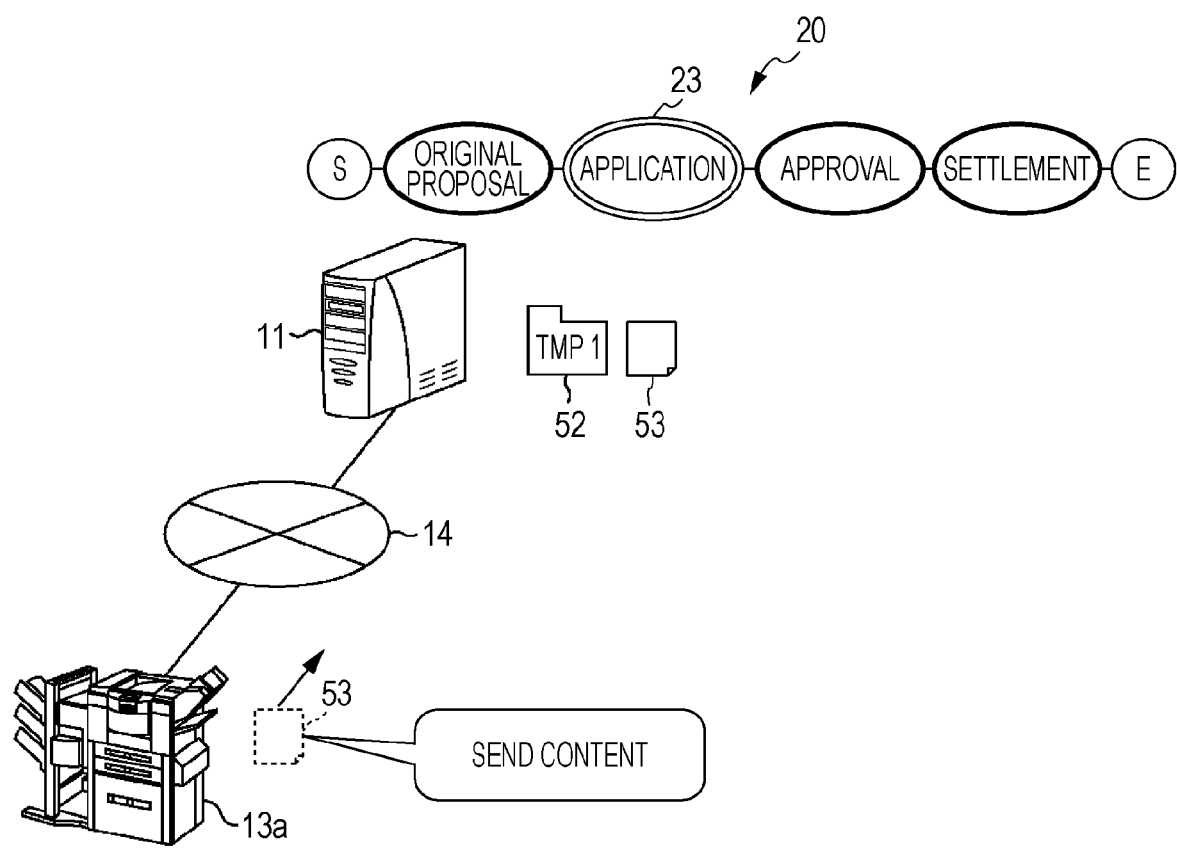
FIG. 6E is a diagram schematically illustrating an example of a state in which content is sent to the folder represented by the path of the folder included in a server apparatus according to the first exemplary embodiment of the present invention.

The users A and C who are specified by the employee role assigned to the application activity 23 to be processed by the image processing apparatus 13a operate the image processing apparatus 13a to log into the image processing apparatus 13a. The image processing apparatus 13a performs certain processing for login (login processing) in step S507. In step S508, the image processing apparatus 13a sends content 53 to the Send destination registered in step S506 in accordance with operations performed by the users A and C. FIG. 6E is a diagram schematically illustrating an example of a state in which the content 53 is sent to the folder 52 represented by the path of the folder 52 included in the server apparatus 11.

In step S509, the server apparatus 11 stores the content 53 sent by the image processing apparatus 13a in the folder 52 generated in step S505.

An example of a storage unit is realized by performing the operation of step S509, in this exemplary embodiment.

Figures 6F, 7:
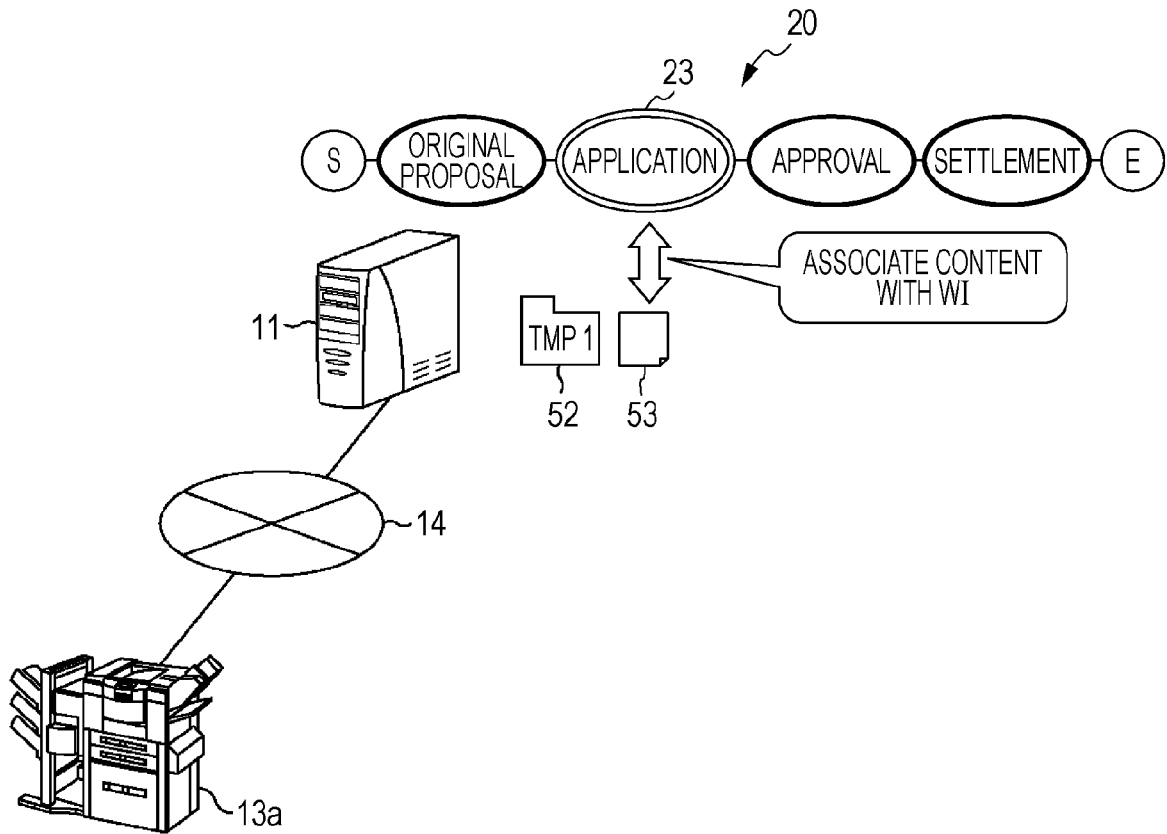
FIG. 6F is a diagram schematically illustrating an example of a state in which the content is associated with the work item according to the first exemplary embodiment of the present invention.
FIG. 7 is a diagram illustrating an example of information on the Send destination registered in the image processing apparatus according to the first exemplary embodiment of the present invention.

In step S510, the server apparatus 11 performs processing of associating the content 53 stored in step S509 with the work item. FIG. 6F is a diagram schematically illustrating an example of a state in which the content 53 is associated with the work item. In this exemplary embodiment, since the application activity 23 is to be processed by the image processing apparatus 13a, a work item corresponding to the application activity 23 is associated with the content 53. The association processing performed in step S510 will be described in detail hereinafter with reference to FIG. 9.

In step S511, the server apparatus 11 determines whether all the activities (work items) 22 to 25 of the workflow 20 selected in step S501 have been processed. When the determination is negative in step S511, the process returns to step S503, and the operations described above are performed on the next activity.

When the determination is positive in step S511, the server apparatus 11 further determines whether all the workflows managed have been processed in step S512. When the determination is negative in step S512, the process returns to step S501, and the operations described above are performed on the workflows which have not yet been processed. When the determination is affirmative in step S512, the processing of the flowchart shown in FIG. 5 is terminated.

FIG. 7 is a diagram illustrating an example of information on the Send destination registered in the image processing apparatus 13a in step S506 of FIG. 5.

In FIG. 7, a destination name 71 represents a name displayed as a Send destination in a display panel of the image processing apparatus 13a when the content 53 is sent by the image processing apparatus 13a. In this exemplary embodiment, an arbitrary name in which operation of a workflow is easily recognizable by the users A and C is registered as the destination name 71.

A protocol 72 represents a method for sending the content 53. In the example shown in FIG. 7, an SMB (Server Message Block) protocol is specified as the protocol 72. A host name 73 represents a name of a host of the server apparatus 11, and a path 74 of a folder represents an absolute path of the folder 52 generated in step S505 of FIG. 5. By registering such Send destinations in all the image processing apparatuses 13a and 13b managed by the server apparatus 11, the image processing apparatuses 13a and 13b prepare for execution of work items.

Figure 8A:
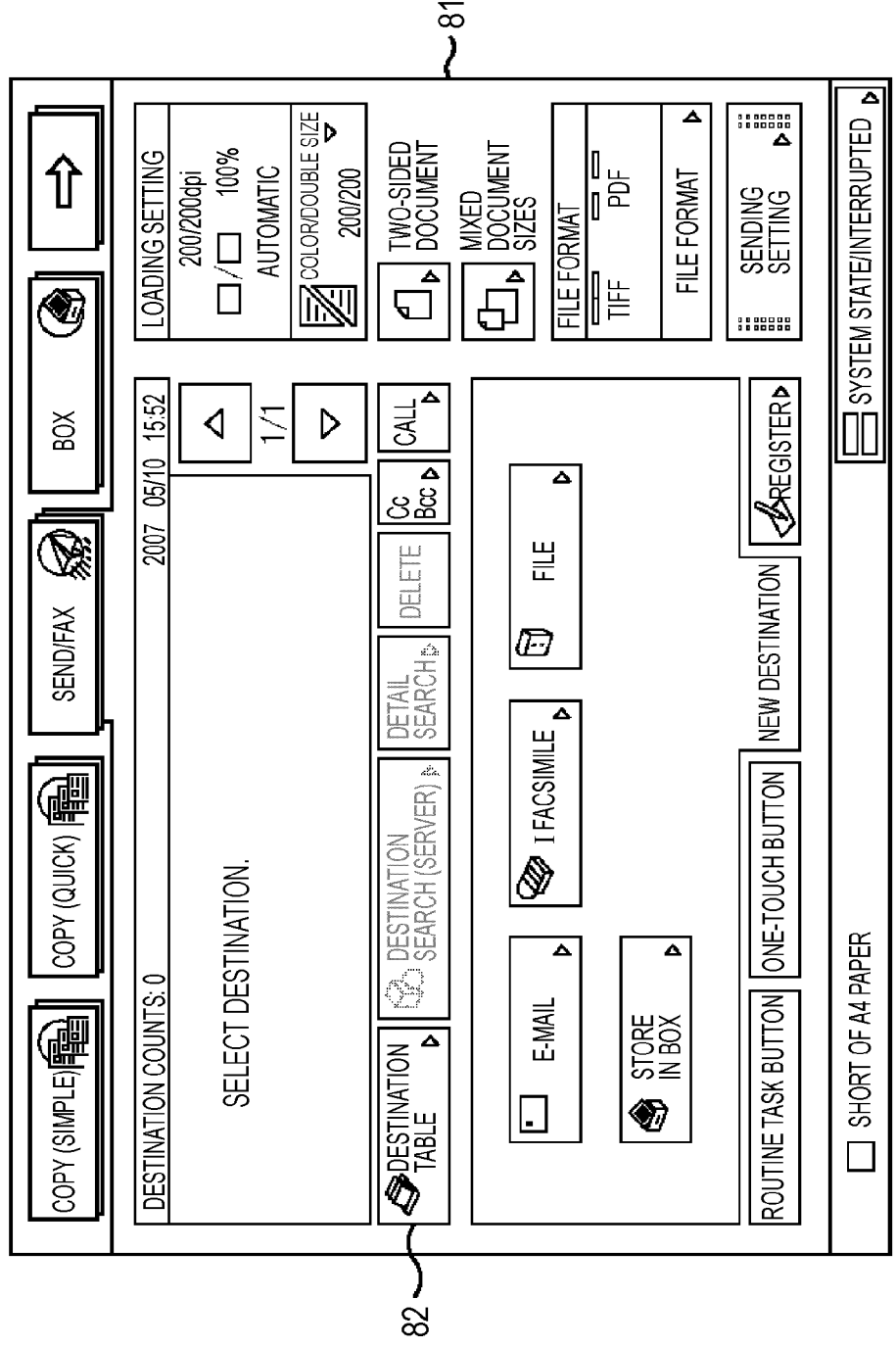

FIGS. 8A and 8B are diagrams illustrating examples of images displayed in the display panel included in the image processing apparatus 13a when the content 53 is sent. Specifically, FIG. 8A is a diagram illustrating an example of a Send screen 81 displayed in the display panel of the image processing apparatus 13a when the content 53 is to be sent, and FIG. 8B is a diagram illustrating an example of a destination-table screen 83 displayed in the display panel of the image processing apparatus 13a when a destination-table button 82 in the Send screen 81 shown in FIG. 8A is selected.

When the work item corresponding to the application activity 23 of the workflow 20 managed by the server apparatus 11 is to be executed, the users A and C select the destination-table button 82 included in the Send screen 81 shown in FIG. 8A. This selection is performed using an operation button or a touch panel, included in the image processing apparatus 13a. As shown in FIG. 8B, the destination-table screen 83 which displays the "Send destination (destination of sending) of the content 53" registered in the image processing apparatus 13a is displayed in the display panel included in the image processing apparatus 13a. The users A and C select a destination 84 registered in step S506 of FIG. 5 from the destination-table screen 83, and instructs the image processing apparatus 13a to send the content 53. The content 53 is sent to the server apparatus 11. Information on an attribute of the content 53, such as information on date and time when the content 53 is generated, is also sent to the server apparatus 11 with the content 53.

Figure 9:
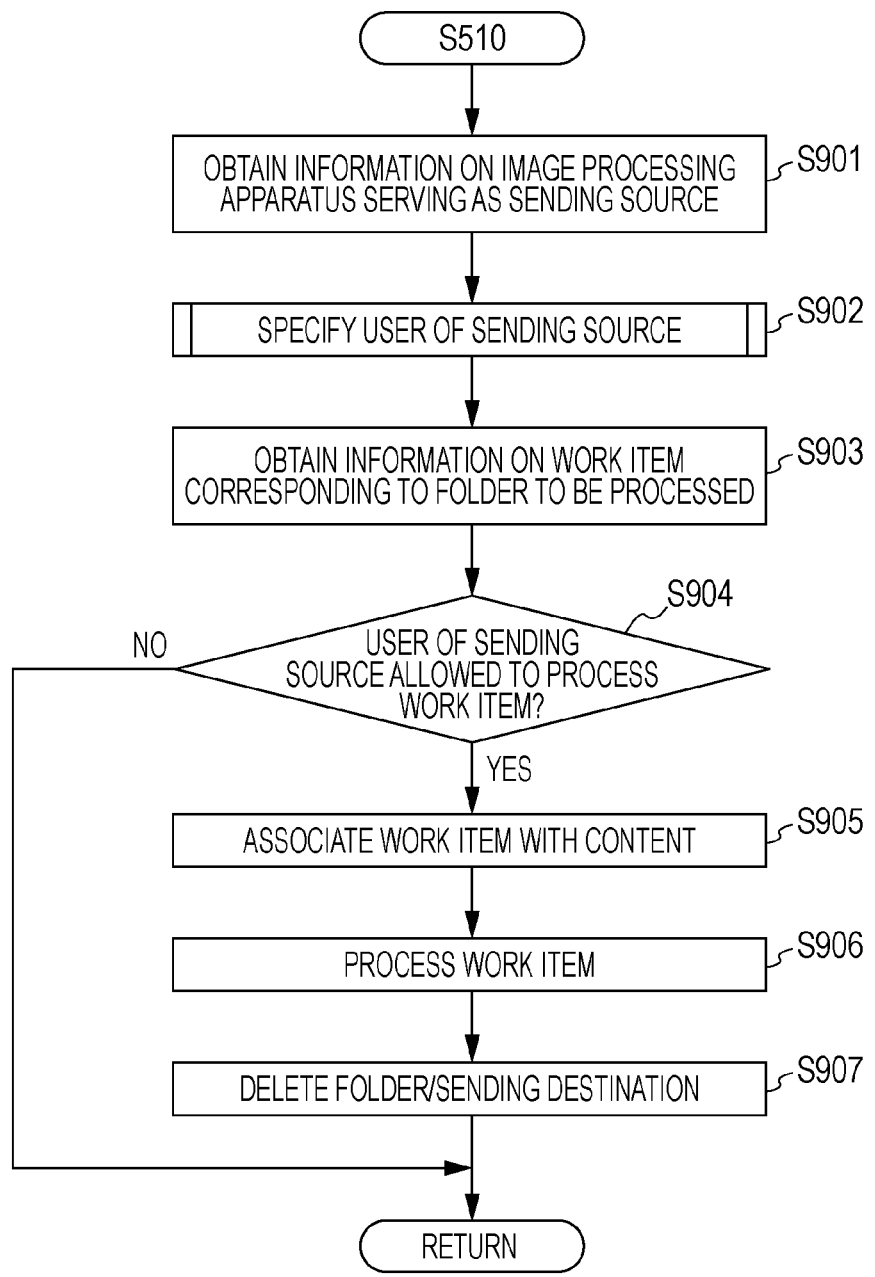
FIG. 9 is a flowchart illustrating an example of detailed processing of associating the content with the work item according to the first exemplary embodiment of the present invention.

FIG. 9 is a flowchart illustrating an example of detailed processing for associating the content with the work item.

When the content 53 sent from the image processing apparatus 13a is stored in the folder 52 in step S509 of FIG. 5, this processing is started.

In step S901, the server apparatus 11 obtains information on the image processing apparatus 13a serving as a source of sending (Send source) of the content 53 in accordance with the information supplied with the content 53.

In step S902, the server apparatus 11 specifies the image processing apparatus 13a of interest in accordance with the information obtained in step S901, and specifies a user who instructed the sending (Send) of the content 53. The operation of step S902 will be described in detail hereinafter with reference to FIG. 10.

The folder 52 generated in step S505 of FIG. 5 has been associated with a certain work item of the workflow 20 (the work item corresponding to the application activity 23 in this exemplary embodiment). The server apparatus 11 obtains information on the work item corresponding to the folder 52 in step S903.

Each of the work items processed in the workflow processing system of this exemplary embodiment includes information on a role which is used to determine a user who can execute the work item. In step S904, in accordance with the information obtained in step S903, the server apparatus 11 determines whether a user of the Send source specified in step S902 is allowed to instruct execution of the processing performed on the work item corresponding to the information obtained in step S903.

An example of an authority determination unit is realized by performing the operation of step S904, in this exemplary embodiment.

When the determination is negative in step S904, the processing of the flowchart of FIG. 9 is terminated and the process proceeds to step S511 of FIG. 5.

When the determination is positive in step S904, the process proceeds to step S905. In step S905, the server apparatus 11 associates the content 53 supplied from the image processing apparatus 13a (Send) with the work item corresponding to the folder 52 which includes the content 53 stored therein.

An example of an association unit is realized by performing the operation of step S905, in this exemplary embodiment.

In step S906, the server apparatus 11 performs processing on the work item corresponding to the folder 52 which includes the content 53 stored therein.

After the processing performed on the work item corresponding to the folder 52 is terminated, the folder 52 generated in step S505 and the path 74 of the Send destination registered in step S506 of FIG. 5 are no longer required. In step S907, the server apparatus 11 deletes the folder 52 and the path 74 of the Send destination in this order. The processing of the flowchart of FIG. 9 is thus terminated, and the process proceeds to step S511 of FIG. 5. The path 74 of the Send destination is deleted when the server apparatus 11 instructs the image processing apparatus 13a to delete the path 74.

Examples of a folder deleting unit and a location information deleting unit are realized by performing the operation of step S907, in this exemplary embodiment.

Figure 10:
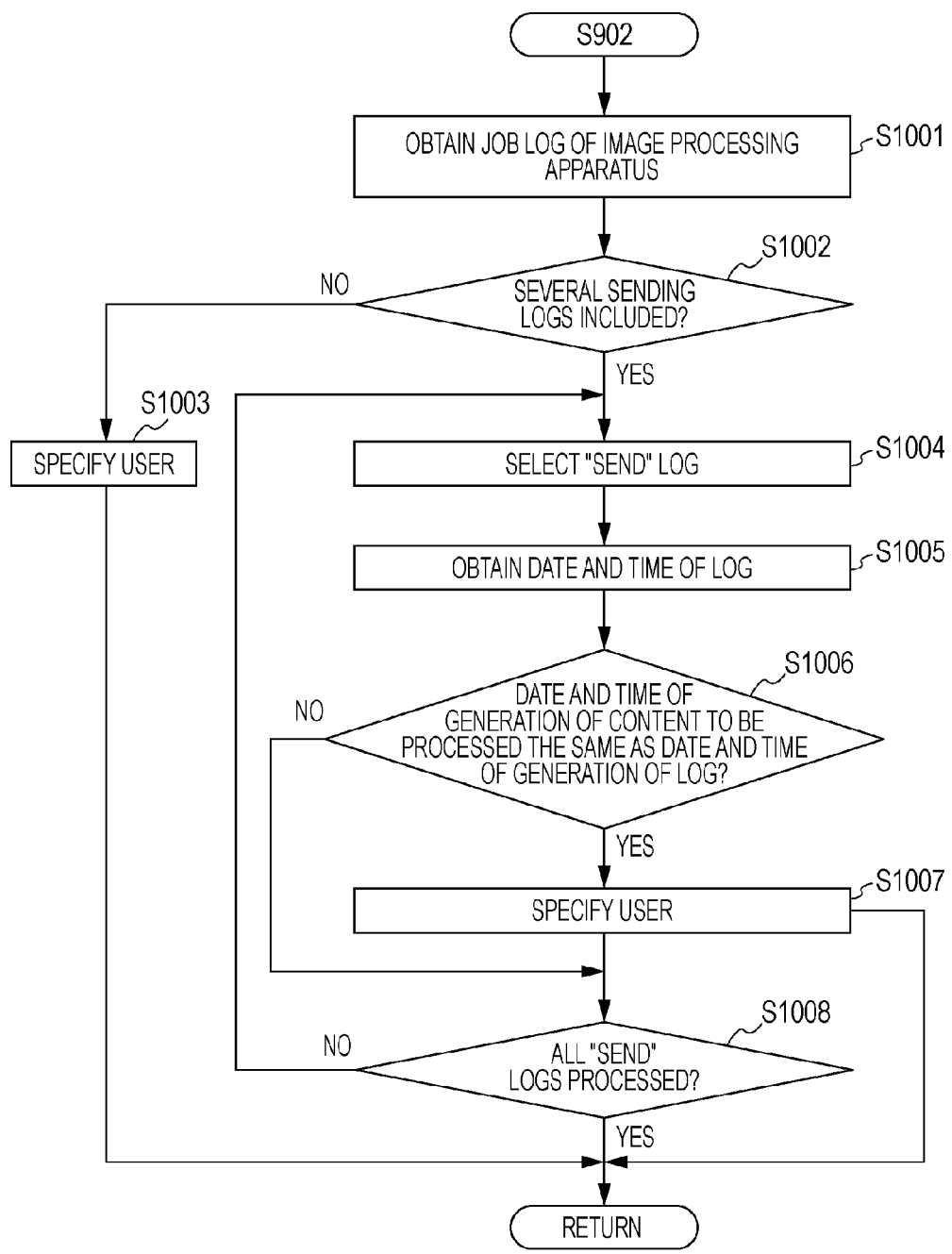
FIG. 10 is a flowchart illustrating an example of processing of specifying a user who issued an instruction on sending of the content according to the first exemplary embodiment of the present invention.

FIG. 10 is a flowchart illustrating an example of the operation of step S902 of FIG. 9 (processing of specifying a user who issued an instruction on sending (Send) of the content 53) in detail.

When the information on the image processing apparatus 13a is obtained in step S901 of FIG. 9, this processing is started.

In step S1001, the server apparatus 11 obtains a job log of the image processing apparatus 13a from the image processing apparatus 13a specified in accordance with the information obtained in step S901 of FIG. 9. FIGS. 11A and 11B are diagrams illustrating examples of a job log. As shown in FIGS. 11A and 11B, logs including detailed operations of the image processing apparatuses 13a and 13b are described in job logs 101 and 102. The image processing apparatus 13a obtains the job logs 101 and 102 shown in FIGS. 11A and 11B, respectively. Alternatively, the image processing apparatus 13a may obtain the job log 101 of FIG. 11A and the image processing apparatus 13b may obtain the job log 102 of FIG. 11B.

An example of a log obtaining unit is realized by performing the operation of step S1001, in this exemplary embodiment.

In the workflow processing system of this exemplary embodiment, in order to specify the user who issued the instruction on sending (Send) of the content 53 to the server apparatus 11, processing is performed.

In step S1002, the server apparatus 11 determines whether a plurality of log items relating to Send are included in the job log obtained in step S1001. When it is determined that only a single log item relating to Send is included in the job log in step S1002, the server apparatus 11 determines a user registered in the log item as a user who issued the instruction of sending (Send) of the content 53 to the server apparatus 11 in step S1003.

An example of a specifying unit is realized by performing the operation of step S1003, in this exemplary embodiment.

When it is determined that a plurality of log items relating to the sending operation are included in the job log in step S1002, the server apparatus 11 selects, among all the plurality of log items relating to Send, one of the log items which have not yet been processed in step S1004.

In step S1005, the server apparatus 11 obtains a date and time, which is an example of a time point when an operation corresponding to the selected log item is executed (a date and time when the content 53 is sent). In step S1006, the server apparatus 11 determines whether the date and time of the log item obtained in step S1005 is the same as the date and time when the content 53 (content of interest) which was sent from the image processing apparatus 13a and which was stored in the folder 52 is generated. Although the determination is made as to whether the date and time of the log item obtained in step S1005 is the same as the date and time when the content 53 is generated, the determination may be made as to whether the date and time of the log item obtained in step S1005 is included in a predetermined period of time.

When the determination is negative in step S1006, step S1007 is skipped and the process proceeds to step S1008. In step S1008, the server apparatus 11 determines whether all the plurality of log items relating to Send are processed through step S1004 to step S1006. When the determination is positive in step S1008, the processing of the flowchart of FIG. 10 is terminated, and the process proceeds to step S903 of FIG. 9.

When the determination is negative in step S1008, the process returns to step S1004, and one of the other log items which have not yet been processed is subjected to the processing.

When the determination is affirmative in step S1006, the server apparatus 11 performs processing below. The server apparatus 11 determines the user registered in the log item as the user who issued the instruction of the sending (Send) of the content 53 to the server apparatus 11 in step S1007. The processing of the flowchart of FIG. 10 is thus terminated, and the process proceeds to step S903 of FIG. 9.

An example of a specifying unit is realized by performing the operation of step S1007, in this exemplary embodiment.

Operation information "Send to TMP1" is registered in the job log 101 of FIG. 11A. This operation information represents that content was sent to a TMP1 folder. Since the job log 101 of FIG. 11A includes only a single log item relating to Send, a user who issued an instruction on sending (Send) of the content to the TMP1 folder is specified in step S1003 of FIG. 10.

Operation information "Send to TMP2" is registered in the job log 102 of FIG. 11B. This operation information represents that content was sent to a TMP2 folder. Since the job log 102 of FIG. 11B includes two log items relating to Send, users who issued instructions on sending (Send) of the content to the TMP2 folder are specified in step S1007 of FIG. 10.

Although each of the job logs 101 and 102 includes a date and time, user information, and operation information, as information items thereof, the information items are not particularly limited to those included here.

The server apparatus 11 generates the folder 52 for the content 53 which is sent from the image processing apparatus 13a, and set the path 74 of the folder 52 as the Send destination of the content 53 to the image processing apparatus 13a in this exemplary embodiment. The users A and C are allowed to select the Send destination set using the display panel of the image processing apparatus 13a so that the image processing apparatus 13a sends the content 53 to the Send destination. The image processing apparatus 13a processes the work items of the workflow 20 managed by the server apparatus 11. Accordingly, the image processing apparatus 13a is not required to store a specific application, and therefore, even an image processing apparatus which is not equipped with a Java (registered trademark) platform, for example, can be employed in the workflow 20. Accordingly, even when the image processing apparatus 13a does not include a specific application, the workflow 20 is executed using the image processing apparatus 13a.

The server apparatus 11 determines whether one of the image processing apparatuses 13a and 13b or the PC 12 performs processing in accordance with each of the work items of the workflow. Processing of returning the work item is performed in accordance with an apparatus (one of the image processing apparatuses 13a and 13b or the PC 12) which executed the work item. When a work item executed by the PC 12 is to be executed again, the work item is directly returned to the PC 12. When the work item is returned to one of the image processing apparatuses 13a and 13b, one of the image processing apparatuses 13a and 13b is not capable of performing processing in accordance with the work item. When a work item which was executed by one of the image processing apparatuses 13a and 13b is to be executed again, one of the image processing apparatuses 13a and 13b outputs a report representing that the work item should be executed again.

A second exemplary embodiment of the present invention will now be described.

In the first exemplary embodiment described above, each of the image processing apparatuses 13a and 13b which execute the workflow does not include specific applications. A second exemplary embodiment employs an environment similar to an actual network environment. In this exemplary embodiment, an image processing apparatus including a specific application installed therein is included in a system so that the image processing apparatus is operated similarly to a PC. The second exemplary embodiment is different from the first exemplary embodiment in that the image processing apparatus including a specific application installed therein is included in the system. Processing of the second exemplary embodiment performed on the basis of such a configuration is different from that of the first exemplary embodiment. Components of the second exemplary embodiment similar to those of the first exemplary embodiment are denoted by reference numerals similar to those shown in FIGS. 1 to 11, and detailed descriptions thereof are omitted.

Figure 12A:
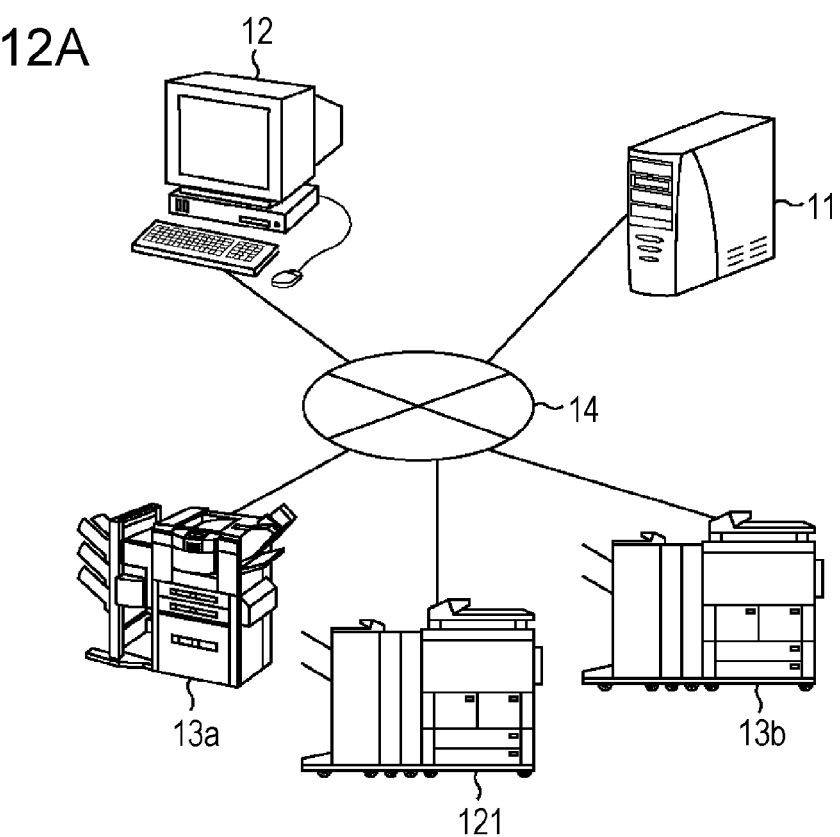
FIGS. 12A and 12B are diagrams illustrating examples of a configuration of an entire workflow processing system according to a second exemplary embodiment of the present invention.
Figure 12B:
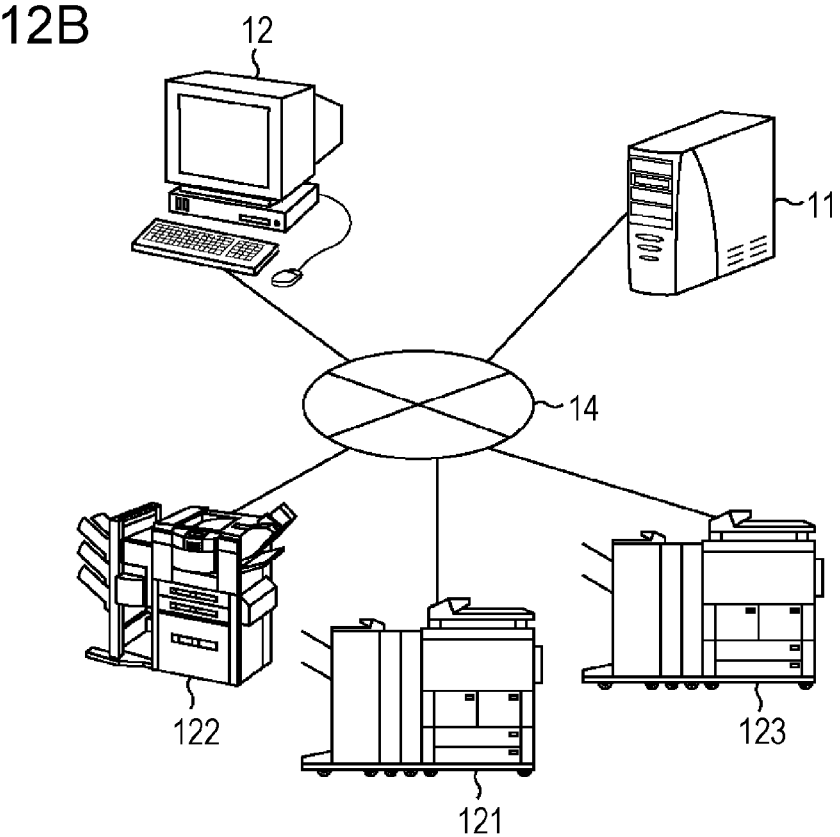

FIGS. 12A and 12B are diagrams illustrating examples of a configuration of an entire workflow processing system.

In a system shown in FIG. 12A, an image processing apparatus 121 including a specific application which is used to execute a workflow is added to the system of the first exemplary embodiment shown in FIG. 1. The image processing apparatus 121 including the specific application used to execute the workflow and image processing apparatuses 13a and 13b which do not include the specific application are included in the same system shown in FIG. 12A.

All image processing apparatuses 121 to 123 include specific applications used to execute a workflow in the system shown in FIG. 12B.

FIG. 13 is a flowchart illustrating an example of processing of the workflow processing system when work items are processed using specific applications included in the image processing apparatuses 121 to 123. FIG. 13 shows an example of an operation of the workflow processing system shown in FIG. 12B. Since operations of the image processing apparatuses 121 to 123 are the same, only the operation of the image processing apparatus 121 is described herein and the operations of the image processing apparatuses 122 and 123 are omitted.

A user of the image processing apparatus 121 logs into the specific application installed in the image processing apparatus 121. The image processing apparatus 121 performs processing for a login (login processing in step S1201.

In step S1202, the image processing apparatus 121 requests the server apparatus 11 to perform searching for a work item to which the logged-in user can access.

In step S1203, the server apparatus 11 which received the request of the work-item searching analyzes workflows managed, and obtains a list of work items to which the user who logged in in step S1201 can access in accordance with the analysis. In step S1204, the server apparatus 11 sends the obtained list of the work items to the image processing apparatus 121 which performed the work-item searching request.

In step S1205, the image processing apparatus 121 displays the received list of the work items in a display panel included therein. In step S1206, the image processing apparatus 121 allows the logged-in user to select one of the work items. This selection operation is performed using an operation button or a touch panel included in the image processing apparatus 121.

In step S1207, the image processing apparatus 121 loads (executes) "processing of the image processing apparatus" corresponding to the work item selected in step S1206.

In step S1208, the image processing apparatus 121 displays a processing screen for the execution of the processing corresponding to the work item selected in step S1206 in the display panel included therein. After the processing corresponding to the work item selected in step S1206 is terminated, the image processing apparatus 121 executes work-item completion processing. In step S1209, the image processing apparatus 121 notifies the server apparatus 11 of the completion of the processing corresponding to the work item (work-item completion notification).

The server apparatus 11 which received the work-item completion notification performs work-item completion processing in step S1210, and the processing of the flowchart of FIG. 13 is terminated.

Figure 14A:
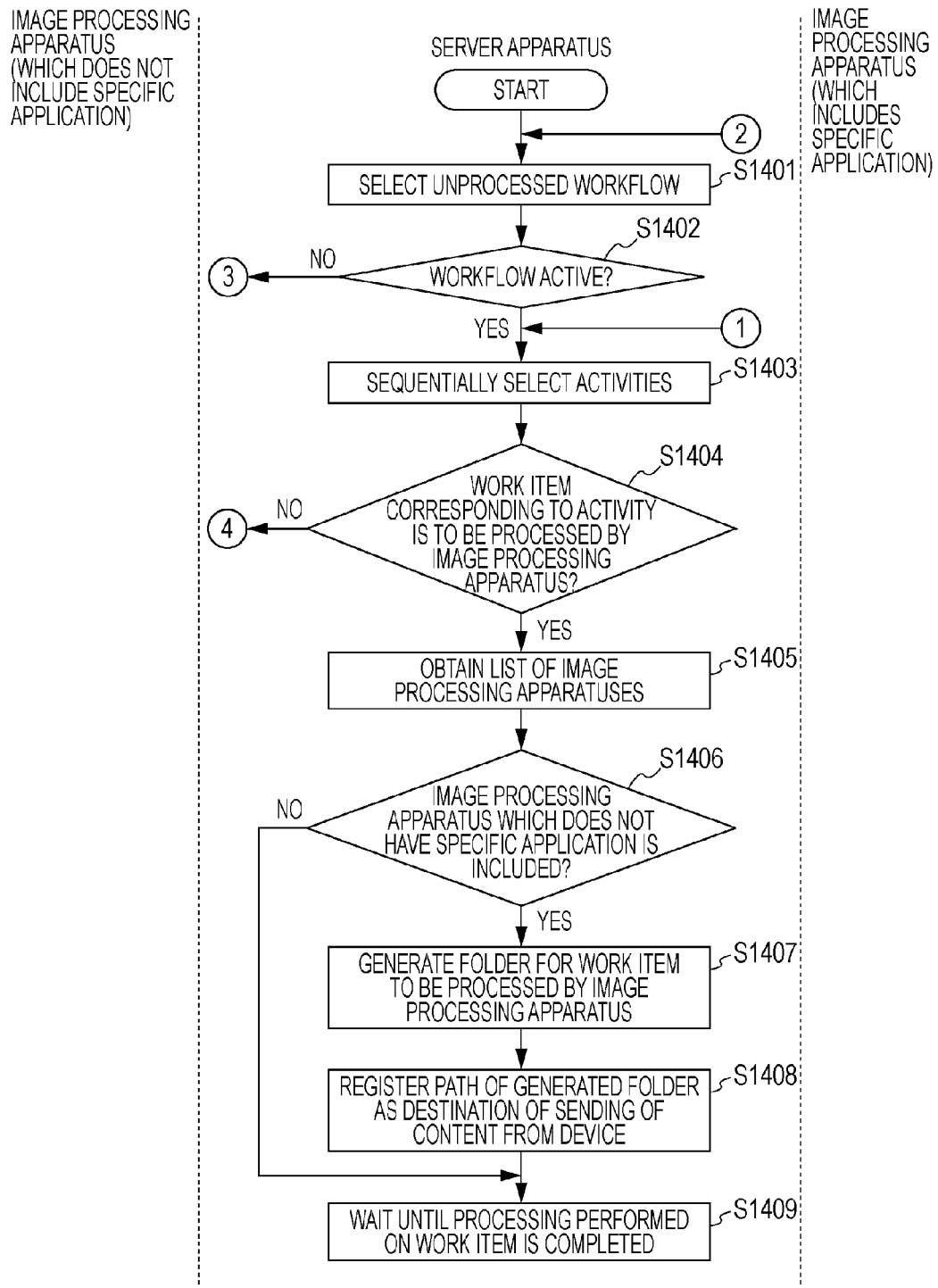
FIG. 14A is a flowchart illustrating an example of processing of the workflow processing system including image processing apparatuses having the specific applications and image processing apparatuses which do not have the specific applications, according to the second exemplary embodiment of the present invention.
Figure 14B:
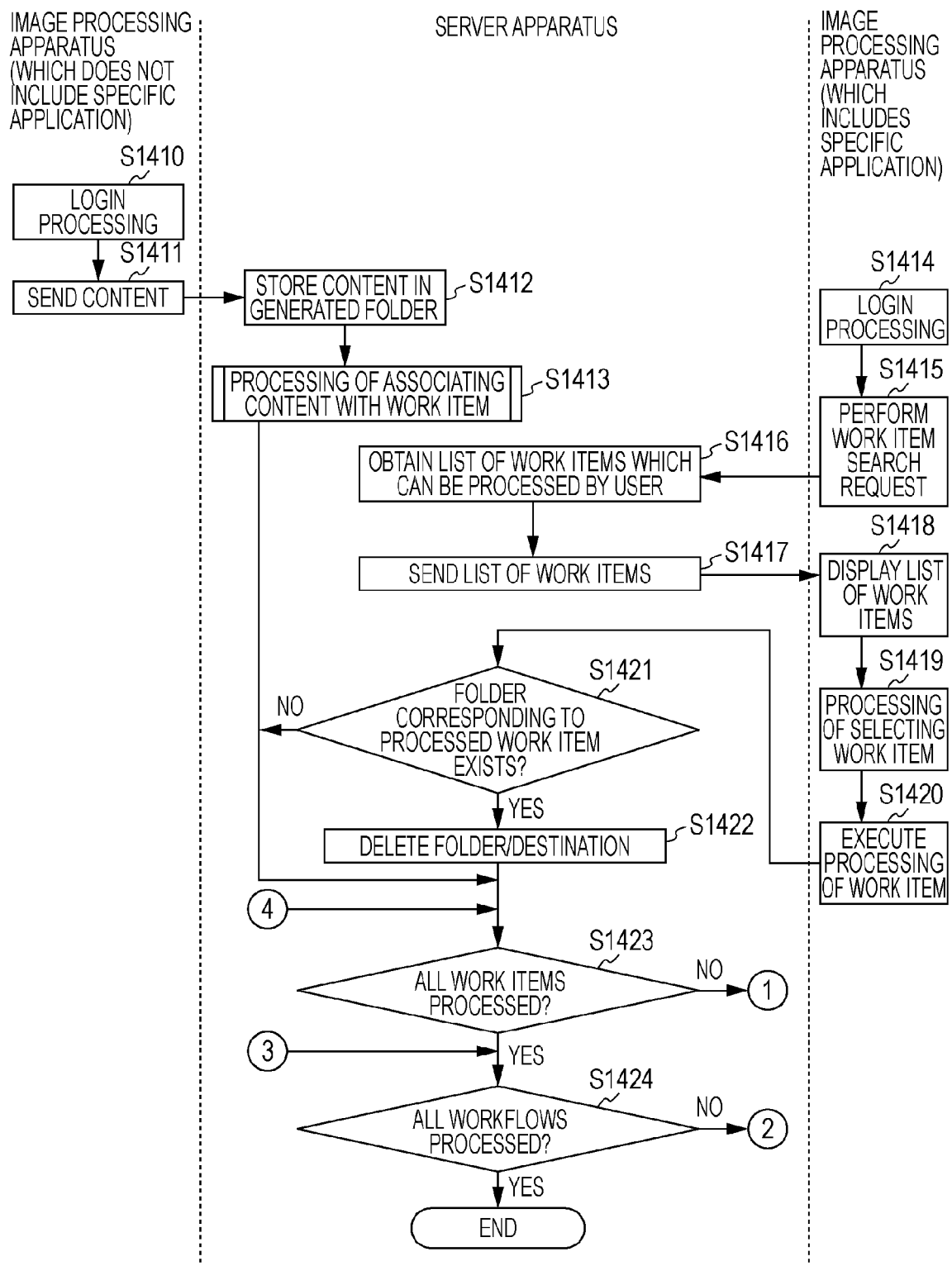
FIG. 14B is a flowchart following the flowchart of FIG. 14A according to the second exemplary embodiment of the present invention.

FIGS. 14A and 14B are flowcharts illustrating examples of processing of the workflow processing system including the image processing apparatuses 121 to 123 having the specific applications and the image processing apparatuses 13a and 13b which do not have the specific applications. Since the image processing apparatuses 13a and 13b are the same as each other and the image processing apparatuses 121 to 123 are the same as one another, only the image processing apparatus 13a and the image processing apparatus 121 are described as needed, and descriptions of the image processing apparatus 13b and the image processing apparatuses 122 and 123 are omitted.

In step S1401, the server apparatus 11 selects, from among workflows managed, one (a workflow 20) workflow which has not been processed.

In step S1402, the server apparatus 11 determines whether the workflow 20 selected in step S1401 is in an active state.

When the determination is negative in step S1402, the process proceeds to step S1424 of FIG. 14B, which will be described hereinafter. When the determination is positive in step S1402, the process proceeds to step S1403.

In step S1403, the server apparatus 11 successively selects activities 22 to 25 of the workflow 20 selected in step S1401 from the original proposal activity 22.

In this exemplary embodiment, the activities 22 to 25 of the workflow 20 are categorized into activities to be processed by a PC 12 and activities to be processed by the image processing apparatuses 13a and 121. In step S1404, the server apparatus 11 determines whether a work item corresponding to the activity selected, in step S1403, from among the activities 22 to 25 of the workflow 20 which is in the active state is to be processed by the image processing apparatuses 13a and 121.

When the determination is negative in step S1404, the process proceeds to step S1423 of FIG. 14B, which will be described hereinafter. When the determination is positive, the process proceeds to step S1405.

In step S1405, the server apparatus 11 obtains information (a list of image processing apparatuses) representing a list of the image processing apparatuses 13a, 13b, 121, 122, and 123 which may execute workflows managed. This image processing apparatus list may be registered in the server apparatus 11 in advance, or may be generated in accordance with information obtained in step S1405 by the server apparatus 11 from the image processing apparatuses 13a, 13b, 121, 122, and 123. An example of a list obtaining unit is realized by performing the operation of step S1405, in this exemplary embodiment.

In step S1406, the server apparatus 11 determines whether an image processing apparatus which does not include a specific application used to execute a workflow is included in the image processing apparatus list obtained in step S1405.

An example of a first determination unit is realized by performing the operation of step S1406, in this exemplary embodiment.

When it is determined that an image processing apparatus which does not include a specific application used to execute a workflow is not included, all the image processing apparatuses include specific applications installed therein, the process proceeds to step S1409. In step S1409, the server apparatus 11 waits until the work item corresponding to the activity selected in step S1403 is processed by one of the image processing apparatuses including the specific applications. In this exemplary embodiment, when the workflow processing system shown in FIG. 12B is employed, the determination is negative in step S1406 and the operation of step S1409 is performed.

When it is determined that at least one image processing apparatus which does not include the specific application used to execute a workflow is included, the process proceeds to step S1407. In step S1407, the server apparatus 11 generates a folder 52 for the work item to be processed by the image processing apparatus 13a which does not include the specific application.

An example of a generator is realized by performing the operation of step S1407, in this exemplary embodiment.

In step S1408, the server apparatus 11 registers a path (information on a location) of the folder 52 generated in step S1408 as a Send destination (destination of sending) in the image processing apparatus 13a which does not include the specific application installed therein.

An example of a registration unit is realized by performing the operation of step S1408, in this exemplary embodiment.

In step S1409, the server apparatus 11 waits until the work item corresponding to the activity selected in step S1403 is processed by the image processing apparatus 13a which does not include the specific application. In this exemplary embodiment, when the workflow processing system shown in FIG. 12A is employed, the determination is positive in step S1406 and the operations in step S1407 to step S1409 are performed.

Where the work item is executed by the image processing apparatuses 13a and 13b which do not include the specific applications and where the work item is executed by the image processing apparatuses 121 to 123 which include the specific applications are separately described.

Processing by Image Processing Apparatus which do not Include Specific Application Users A and C who are specified by an employee role assigned to the application activity 23 to be processed by the image processing apparatus 13a operate the image processing apparatus 13a to log into the image processing apparatus 13a. The image processing apparatus 13a performs certain processing for login (login processing) in step S1410 of FIG. 14B. In step S1411, the image processing apparatus 13a sends content 53 to the Send destination registered in step S1408 in accordance with operations performed by the users A and C.

In step S1412, the server apparatus 11 stores the content 53 sent from the image processing apparatus 13a in the folder 52 generated in step S1407.

An example of a storage unit is realized by performing the operation of step S1412, in this exemplary embodiment.

In step S1413, the server apparatus 11 performs processing of associating the content 53 stored in step S1412 with the work item. The operation of step S1413 is performed by executing the flowcharts of FIGS. 9 and 10.

Examples of a determination unit, an association unit, a folder deleting unit, a location information deleting unit, a log obtaining unit, and a specifying unit are realized by performing the operation of step S1413, in this exemplary embodiment.

In step S1423, the server apparatus 11 determines whether all the activities (work items) 22 to 25 of the workflow 20 selected in step S1401 have been processed. When the determination is negative in step S1423, the process returns to step S1403, and the operations described above are performed on the next one of the activities 22 to 25.

When the determination is positive in step S1423, the server apparatus 11 further determines whether all the workflows managed have been processed in step S1424. When the determination is negative in step S1424, the process returns to step S1401 of FIG. 14A, and the operations described above are performed on the workflows which have not yet been processed. When the determination is positive in step S1423, the processing of the flowchart shown in FIG. 14 is terminated.

Processing by Image Processing Apparatus which Includes Specific Application

A user of the image processing apparatus 121 logs into the specific application installed in the image processing apparatus 121. The image processing apparatus 121 performs certain processing for login (login processing) in step S1414.

In step S1415, the image processing apparatus 121 requests the server apparatus 11 to search for a work item to which the logged-in user can access (work-item searching request).

In step S1416, the server apparatus 11 which received the request of the work-item searching analyzes workflows managed, and obtains a list of work items to which the user who logged in in step S1414 can access in accordance with the analysis. In step S1417, the server apparatus 11 sends the obtained list of the work items to the image processing apparatus 121 which performed the work-item searching request.

In step S1418, the image processing apparatus 121 displays the received list of the work items in a display panel included therein. In step S1419, the image processing apparatus 121 allows the logged-in user to select one of the work items.

The image processing apparatus 121 loads (executes) "processing in the image processing apparatus" corresponding to the work item selected in step S1419. After the processing corresponding to the work item selected in step S1419 is terminated, the image processing apparatus 121 notifies the server apparatus 11 of the completion of the processing corresponding to the work item in step S1420 (work-item completion notification). This operation of step S1420 is the same as the operations of step S1207 to step S1209 of FIG. 13.

In step S1421, the server apparatus 11 which received the work-item completion notification determines whether a folder for the work item processed by the image processing apparatus 121 was generated.

An example of a second determination unit is realized by performing the operation of step S1421, in this exemplary embodiment.

When the determination is negative in step S1421, the process proceeds to step S1423. In step S1423, the server apparatus 11 determines whether all the activities (work items) 22 to 25 of the workflow 20 selected in step S1401 have been processed.

When the determination is positive in step S1421, the process proceeds to step S1422. In step S1422, the image processing apparatus 121 deletes the folder and the path of the Send destination (the folder) registered along with the folder in step S1408 in an order of the folder and the path of the Send destination. The path of the Send destination is deleted when the server apparatus 11 instructs the image processing apparatus 13a to delete the path.

Examples of a folder deleting unit and a location information deleting unit are realized by performing the operation of step S1422, in this exemplary embodiment.

In step S1423, the server apparatus 11 determines whether all the activities 22 to 25 of the workflow 20 selected in step S1401 have been processed.

In FIGS. 14A and 14B, the operations of step S1407, step S1408, step S1412, and step S1413 are operations to be performed when the image processing apparatuses 13a and 13b which do not have the specific applications are included in the system. The operations of step S1416 to step S1422 are operations to be performed when the image processing apparatuses which have the specific applications installed therein are included in the system.

When image processing apparatuses which do not have specific applications and image processing apparatuses which have specific applications are included in a single system, the image processing apparatuses which do not have specific applications can be employed in the workflow 20.

Modifications

In the foregoing exemplary embodiments, the user of the sending source is specified by analyzing the job logs 101 and 102 of the image processing apparatuses 13a and 13b as shown in FIG. 10. However, the user of the sending source may be specified in the following manner.

1. A my button (a GUI, for example) used to rewrite a portion "From" of Send is registered in image processing apparatuses 13a and 13b in advance. In normal Send, a mail address unique to an image forming apparatus is included in a column of "From." When the my button is pressed, information written in the column of "From" is changed to a mail address of the user. The image processing apparatuses 13a and 13b rewrite the information in the column of "From" of Send (information of the Send source) in accordance with a user's operation using the my button, and sends content 53 to a server apparatus 11. The server apparatus 11 specifies the user of a Send source in accordance with the information ("From") of the received content 53.

2. A fixed phrase used to specify a user is registered in image processing apparatuses 13a and 13b in advance, and the image processing apparatuses 13a and 13b send content 53 to which the fixed phrase is attached to a server apparatus 11. The server apparatus 11 specifies a user of a Send source in accordance with the fixed phrase attached to the received content 53.

3. A file including information used to specify a user is registered in image processing apparatuses 13a and 13b in advance, and the image processing apparatuses 13a and 13b send content 53 to which the file is attached to a server apparatus 11. The server apparatus 11 specifies a user of a Send source in accordance with the file attached to the received content 53. The file including the information used to specify the user may be generated at a time when the content 53 is sent.

Processing of associating content and a work item to be performed after a user of a Send source is specified in the modifications is the same as that of the foregoing exemplary embodiments (step S903 to S907 of FIG. 9).

FIG. 15 is a block diagram illustrating an example of a configuration of the server apparatus 11 or the personal computer 12.

In FIG. 15, a CPU 201 controls the entirety of the apparatus in accordance with control programs stored in a RAM 202. The RAM 202 is an internal storage unit which stores the control programs of the apparatus executed by the CPU 201 and data such as a document image.

A network interface (NetI/F) 203 is used to connect the network 14 to the apparatus (the server apparatus 11 or the PC 12) to send and receive data. An external storage device 204 is a magnetic disk which stores data. A display 205 displays various images. A keyboard interface (KeyI/F) 208 is used to connect a keyboard 206 and a pointing device 207 with the apparatus (the server apparatus 11 and the PC 12) with each other.

The programs stored in the RAM 202 are executed by using functions of an OS (Operating System) similarly stored in the RAM 202 as needed. The programs stored in the RAM 202 are used to read and write data to be temporality stored in the RAM 202, to read data from and write data to the external storage device 204, and to send and receive data through the network interface 203. The programs are used to receive input from the keyboard 206 and the pointing device 207 and to display images in the display 205.

Figure 16:
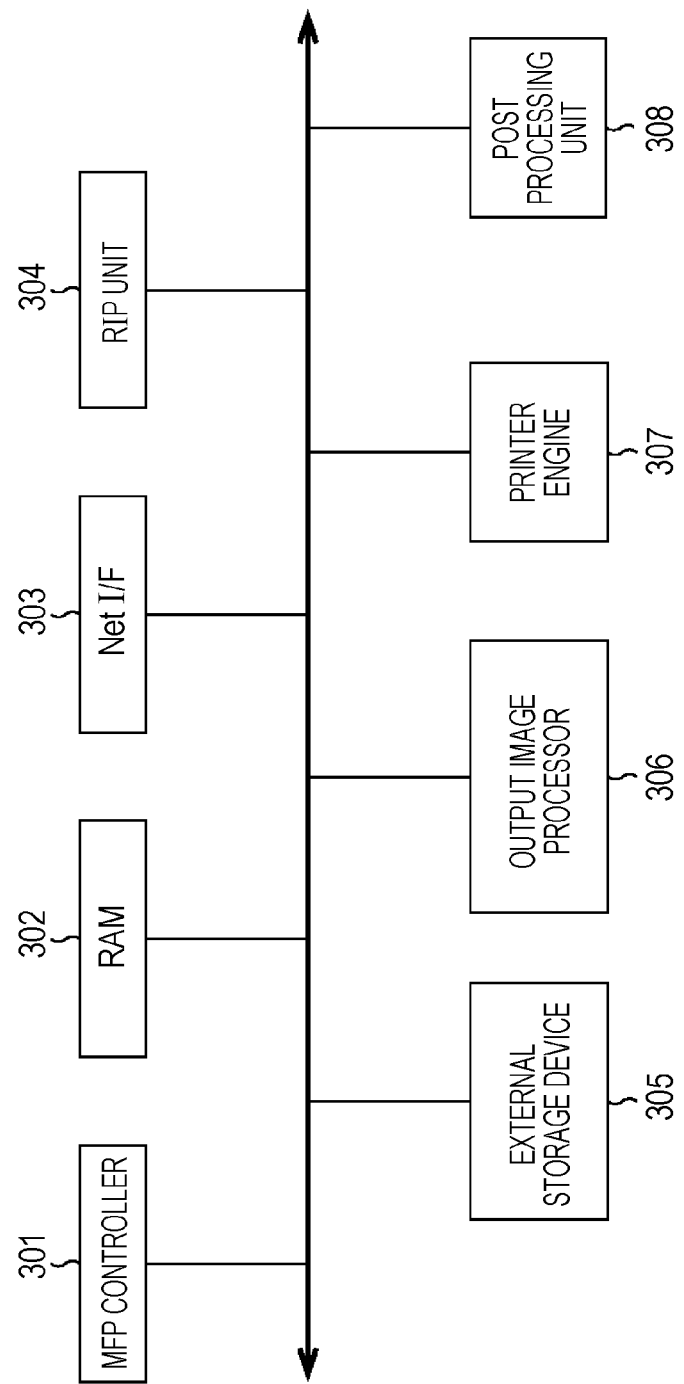
FIG. 16 is a block diagram illustrating an example of a configuration of the image processing apparatus according to the first and second exemplary embodiments of the present invention.

FIG. 16 is a block diagram illustrating an example of a configuration of one of the image processing apparatuses 13, 121 to 123. In FIG. 16, an MFP controller 301 controls the entirety of the image processing apparatus. A RAM 302, a network interface 303, and an external storage device 305 have functions the same as those of the RAM 202, the network interface 203, and the external storage device 204, respectively.

When printing data supplied from the network interface 303 is PDL (Page Description Language) data, a RIP unit 304 analyzes and rasterizes the data. An output image processor 306 performs image processing on the raster data rasterized by the RIP unit 304 to generate image data. A printer engine 307 feeds a sheet and successively prints an image corresponding to image data generated by the output image processor 306 on the sheet, performs a printing-out operation. The sheet printed out is supplied to a post-processing unit 308. The post-processing unit 308 performs a sorting operation on sheets printed out of the printer engine 307 or a finishing operation on the sheets.

Other Exemplary Embodiments

The units included in the workflow management apparatus according to the foregoing exemplary embodiment of the present invention, and the steps of the workflow management method are realized by operating programs stored in a RAM or ROM. The programs and the computer readable recording media including the program recorded therein are also included in the present invention.

The present invention includes other exemplary embodiments such as a system, an apparatus, a method, a program, and a computer-readable storage medium, and particularly, the present invention may be employed in a system including a plurality of apparatuses or a system including a single apparatus.

The present invention further includes a case where software programs which realize the functions of the foregoing exemplary embodiments (programs corresponding to the flowcharts of FIGS. 5, 9, 10, 13, and 14) in the foregoing exemplary embodiment) are directly or remotely supplied to a system or an apparatus. The present invention includes a case where a computer included in the system or the apparatus reads and executes supplied program code.

The program code installed in the computer in order to realize the function processing of the present invention by a computer also realizes the present invention. The present invention includes a computer program which realizes the function processing of the present invention.

The program code may have any format, such as a format of an object code, a program executed by an interpreter, and script data to be supplied to an OS as long as the program code has a function of a program.

Examples of a recording medium which supplies programs include a floppy (registered trademark) disk, a hard disk, an optical disc, a magneto-optical disk, an MO, a CD-ROM (Compact Disc Read Only Memory), a CD-R (Compact Disc Readable), and a CD-RW (Compact Disc ReWritable). Furthermore, a magnetic tape, a nonvolatile memory card, a ROM, and a DVD (Digital Versatile Disc) (including DVD-ROM and DVD-R), for example, may be used.

As an example of a method for supplying programs, a client computer is connected to a website on the Internet using a browser of the client computer. Then, computer programs of the present invention or a compressed file having an auto-installation function may be downloaded from the website to a recording medium such as a hard disk.

A program code included in a program of the present invention may be divided into a plurality of files and the plurality of files may be downloaded from different websites. A WWW server which allows a plurality of users to download the program files used to realize the function processing of the present invention by a computer is also included in the present invention.

The following processing may be performed: the program of the present invention is stored in a storage medium such as a CD-ROM so as to be distributed to users, and a user who satisfies a predetermined condition is allowed to download key information used to decrypt encryption from a website through the Internet. Then, an encrypted program is executed after being decrypted using the downloaded key information so as to be installed in the computer.

Furthermore, the functions of the foregoing exemplary embodiments are realized by executing programs read by a computer. The functions of the foregoing exemplary embodiments may be realized by performing part of or entire processing using the OS, for example, operating in the computer in accordance with instructions of the program.

Furthermore, a program read from the recording medium is written in a function expansion board inserted into the computer of a memory included in a function expansion unit connected to the computer. The functions of the foregoing exemplary embodiments are realized by performing part of or entire processing using a CPU included in the function expansion board or the function expansion unit.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-102687 filed Apr. 10, 2008, which is hereby incorporated by reference herein in its entirety.

What is claimed is:

1. A workflow management apparatus which manages a workflow for executing processing in accordance with work items representing operations, the workflow management apparatus comprising:
   a generator configured to generate a folder for a specific work item to be processed by an image processing apparatus;
   a registration unit configured to register information on a location of the folder generated by the generator as a sending destination of the content generated by the image processing apparatus in accordance with the specific work item;
   a storage unit configured to store the content supplied from the image processing apparatus in the folder serving as the sending destination of the content;
   a log obtaining unit configured to obtain a plurality of job logs each of which corresponds to a job processed by the image forming apparatus and includes information on a user who operated the image processing apparatus and information on the user's operation;
   a selecting unit configured to select a job log corresponding to the content stored by the storage unit from among the plurality of job logs obtained by the log obtaining unit;
   a specifying unit configured to specify a user who issues an instruction of the sending of the content in accordance with the job log selected by the selecting unit;
   an authority determination unit configured to determine whether the user specified by the specifying unit has authority to access the specific work item to be processed by the image processing apparatus in accordance with information on the specific work item; and
   an association unit configured to associate the content stored in the folder by the storage unit with the specific work item corresponding to the folder when the determination unit determined that the user specified by the specifying unit has authority to access the specific work item to be processed by the image processing apparatus,
   wherein the image processing apparatus which includes a program used to execute the workflow acquires the specific work item from the workflow management apparatus and processes the specific work item by using the program without sending the content to the folder generated by the generator, while the image processing apparatus which does not include the program sends the content to the folder thereby the specific work item is processed on the content at the workflow management apparatus.

2. The workflow management apparatus according to claim 1,
   wherein the content supplied from the image processing apparatus includes information on a time point when the content is generated,
   the job log further includes information on a time point when the user's operation is performed, and
   the specifying unit specifies the user including the job log as the user who issued the instruction of the sending of the content when the time point included in the content is equal to the time point included in the job log.

3. The workflow management apparatus according to claim 1, further comprising:
   a folder deleting unit configured to perform processing of deleting the folder after the association unit associates the content stored in the folder by the storage unit with the specific work item corresponding to the folder.

4. The workflow management apparatus according to claim 3, further comprising:
   a location information deleting unit configured to execute processing of deleting the information on the location of the folder after the folder is deleted by the folder deleting unit.

5. The workflow management apparatus according to claim 1, further comprising:
   a list obtaining unit configured to obtain a list including image processing apparatuses managed by the workflow management apparatus;
   a first determination unit configured to determine whether an image processing apparatus which does not include the specific program used to execute the workflow is included in the image processing apparatuses included in the list obtained by the list obtaining unit;
   a second determination unit configured to determine whether the folder corresponding to the specific work item processed by an image processing apparatus which includes the specific program used to execute the workflow is generated by the generator when it is determined that the image processing apparatus which does not include the specific program is not included in the image processing apparatuses included in the list; and
   a deleting unit configured to execute, after the second determination unit determines that the folder is generated, processing of deleting the folder, and thereafter, processing of deleting the information on the location of the folder,
   wherein when the first determination unit determined that the image processing apparatus which does not include the specific program used to execute the workflow is included in the list, the generator generates the folder corresponding to the specific work item to be processed by the image processing apparatus.

6. A method for managing a workflow for processing work items representing operations, the method comprising:
   using a processor for generating a folder for a specific work item to be processed by an image processing apparatus;
   registering information on a location of the generated folder as a sending destination of the content generated by the image processing apparatus in accordance with the specific work item;

storing the content supplied from the image processing apparatus in the folder serving as the sending destination of the content;

obtaining a plurality of job logs each of which corresponds to a job processed by the image processing apparatus and includes information on a user who operated the image processing apparatus and information on the user's operation;

selecting a job log corresponding to the content stored from among the plurality of job logs obtained;

specifying a user who issues an instruction of the sending of the content in accordance with the job log selected;

determining whether the user specified has authority to access the specific work item to be processed by the image processing apparatus in accordance with information on the specific work item; and associating the content stored in the folder with the specific work item corresponding to the folder when determining that the user specified has authority to access the specific work item to be processed by the image processing apparatus, wherein the image processing apparatus which includes a program used to execute the workflow acquires the specific work item from the workflow and processes the specific work item by using the program without sending the content to the folder generated, while the image processing apparatus which does not include the program sends the content to the folder thereby the specific work item is processed on the content at the workflow.

7. A non-transitory computer readable storage medium which stores a program used to execute the method for managing a workflow for processing work items representing operations, the method comprising:

generating a folder for a specific work item to be processed by an image processing apparatus;

registering information on a location of the generated folder as a sending destination of the content generated by the image processing apparatus in accordance with the specific work item;

storing the content supplied from the image processing apparatus in the folder serving as the sending destination of the content;

obtaining a plurality of job logs each of which corresponds to a job processed by the image processing apparatus and includes information on a user who operated the image processing apparatus and information on the user's operation;

selecting a job log corresponding to the content stored from among the plurality of job logs obtained;

specifying a user who issues an instruction of the sending of the content in accordance with the job log selected;

determining whether the user specified has authority to access the specific work item to be processed by the image processing apparatus in accordance with information on the specific work item; and associating the content stored in the folder with the specific work item corresponding to the folder when determining that the user specified has authority to access the specific work item to be processed by the image processing apparatus, wherein the image processing apparatus which includes a program used to execute the workflow acquires the specific work item from the workflow and processes the specific work item by using the program without sending the content to the folder generated, while the image processing apparatus which does not include the program sends the content to the folder thereby the specific work item is processed on the content at the workflow.

* * * * *